US007479993B2

(12) United States Patent
Nakajima et al.

(10) Patent No.: US 7,479,993 B2
(45) Date of Patent: Jan. 20, 2009

(54) IMAGE DEVICE AND METHOD FOR REMOVING NOISE

(75) Inventors: Ken Nakajima, Tokyo (JP); Nobuyuki Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 1087 days.

(21) Appl. No.: 10/432,134

(22) PCT Filed: Sep. 3, 2002

(86) PCT No.: PCT/JP02/08953

§ 371 (c)(1),
(2), (4) Date: Nov. 3, 2003

(87) PCT Pub. No.: WO03/028367

PCT Pub. Date: Apr. 3, 2003

(65) Prior Publication Data

US 2004/0135922 A1 Jul. 15, 2004

(30) Foreign Application Priority Data

Sep. 20, 2001 (JP) ............................. 2001-287036

(51) Int. Cl.
*H04N 5/217* (2006.01)
(52) U.S. Cl. ....................... 348/241; 348/246
(58) Field of Classification Search ................. 348/241, 348/243, 244, 245, 246, 247
See application file for complete search history.

(56) References Cited

U.S. PATENT DOCUMENTS

| 4,573,070 | A | * | 2/1986 | Cooper | ..................... 348/617 |
| 4,654,714 | A | * | 3/1987 | Hurst et al. | ................. 348/247 |
| 4,703,442 | A | * | 10/1987 | Levine | ..................... 384/244 |
| 4,992,877 | A | | 2/1991 | Takayama | |
| 5,204,741 | A | | 4/1993 | Sakaguchi | |
| 5,625,413 | A | * | 4/1997 | Katoh et al. | ................. 348/246 |

(Continued)

FOREIGN PATENT DOCUMENTS

JP 5-51571 3/1993

(Continued)

*Primary Examiner*—David L Ometz
*Assistant Examiner*—Gary C Vieaux
(74) *Attorney, Agent, or Firm*—Frommer Lawrence & Haug LLP; William S. Frommer; Ellen Marcie Emas

(57) ABSTRACT

An image capturing apparatus capable of removing a noise due to a dark signal from a solid-state imaging device is provided. After storing an image signal (A2) obtained through an ordinary capturing in an image memory, an image signal (B2) captured immediately thereafter with a shutter closed is stored in the image memory. Next, respective image signals (A2) and (B2) are supplied to a preprocessing circuit (6a) via a memory controller (6c). An arithmetic circuit (61), by subtracting the image signal (B2) from the image signal (A2), removes a fixed pattern noise and an offset component. A bright spot detection circuit (62) detects an occurrence position of a bright spot noise from the image signal (B2), and in response to this detection, outputs a timing pulse (T1). A black point compensation circuit (63), on the basis of the timing pulse (T1), detects a pixel having a possibility of occurrence of a black point noise, in an image signal (C1) outputted from the arithmetic circuit (61), and compensates for this pixel using a data of a pixel in the vicinity thereof.

8 Claims, 18 Drawing Sheets

U.S. PATENT DOCUMENTS

| | | | |
|---|---|---|---|
| 6,002,433 A * | 12/1999 | Watanabe et al. | 348/246 |
| 6,683,643 B1 * | 1/2004 | Takayama et al. | 348/247 |
| 6,707,493 B1 * | 3/2004 | Lee et al. | 348/246 |
| 7,133,072 B2 * | 11/2006 | Harada | 348/243 |

FOREIGN PATENT DOCUMENTS

| | | |
|---|---|---|
| JP | 5-137073 | 6/1993 |
| JP | 6-303531 | 10/1994 |
| JP | 11-215439 | 8/1999 |
| JP | 11 239298 | 8/1999 |
| JP | 11 355666 | 12/1999 |
| JP | 2000-152092 | 5/2000 |
| JP | 2000-209506 | 7/2000 |
| JP | 2001-24951 | 1/2001 |
| JP | 2001-177768 | 6/2001 |

\* cited by examiner

US 7,479,993 B2

IMAGE DEVICE AND METHOD FOR REMOVING NOISE

TECHNICAL FIELD

The present invention relates to an image capturing apparatus for capturing an object using a solid-state imaging device, and a noise elimination method for eliminating a noise that occurs at the time of this capturing.

BACKGROUND ART

In recent years, a digital camera that stores captured images as digital data is pervading. In this digital camera, images captured through an optical lens are photo-electrically converted using a solid-state imaging device such as a CCD (Charge Coupled Device), a CMOS (Complementary Metal Oxide Semiconductor) image sensor or the like, and then recorded as digital data.

In an image signal thus generated using such imaging devices, there may often be included a noise due to a dark signal occurring in the imaging device caused by various factors in a manufacturing process or a noise occurring in a circuit board or the like. For example, among a fixed pattern noise due to the dark signal, there is a noise due to a large amount of charges occurring at a specific imaging element resulting from such as a structural defect or the like. This noise appears as a white bright spot on a display screen. Hereinafter, this noise is referred to as a bright spot noise. The bright spot noise, which in a normal use seldom occurs very largely, however, because an amount of its occurrence depends on an exposure time and temperatures, becomes remarkably noticeable under a long time of exposure or use in a high temperature environment.

Thereby, in the digital camera, usually, a processing for reducing these fixed pattern noises by correcting an image signal from the imaging device is carried out. As an example of them, a method is known in which, from an image signal which is normally captured with a shutter opened, an image signal which is captured under the same exposure condition thereof but by completely blocking the light with the shutter closed is subtracted.

However, according to the noise reduction method described above, an influence of the noise due to the dark signal cannot completely be eliminated, and there is a case where the spot portion remains conversely as a black point on a display. This problem will be described in the following. FIGS. 18(A) and 18(B) are each a diagram indicating examples of waveforms of image signals captured in the noise reduction method described above. Further, FIG. 19 is a diagram showing an example of waveforms of image signals to be outputted in the noise reduction method described above.

In FIG. 18(A), an example of waveforms of analog signals outputted from the imaging device is indicated. In this signal, on the captured image signal, there are contained bright spot noises N1 to N7 occurring due to dark signals produced by the imaging device, in addition to noise components and a direct current type offset due to noises. In the image capturing apparatus, usually, after these signals are converted to digital signals by an A/D converter, various signal processing such as a noise elimination processing or the like is applied thereto, and then the signals are stored on a recording medium or the like.

Further, FIG. 18(B) shows an example of waveforms of a signal which was captured in a condition with the shutter closed, and outputted from the imaging device. By the way, in FIG. 18(B), respective bright spot noises corresponding to those in FIG. 18(A) are labeled with the same reference numerals. In the noise reduction processing described above, capturing of the signal in this FIG. 18(B) is executed immediately after or before the capturing of the signal in FIG. 18(A) under the same conditions such as of an exposure time or the like. For example, in a case where the signal of FIG. 18(A) is captured precedently, in a state after this signal is digitalized and stored in a predetermined buffer, the signal of FIG. 18(B) is captured immediately thereafter.

Here, the signal of FIG. 18(B), because it is captured with the shutter closed, does not contain any image signal, and is comprised only of a noise component. Therefore, by subtracting the signal of FIG. 18(B) from the signal of FIG. 18(A), a signal waveform as shown in FIG. 19 from which the minute fixed pattern noise and the direct current offset are removed is obtained.

By the way, in FIGS. 18 and 19, a maximum value in a convertible range at the time of A/D conversion of these signals is indicated by a dotted line R. In FIG. 18(A), among the bright spot noises N1 to N7 due to dark signals resulting from the imaging device, especially, the bright spot noises N1, N2 and N3 have such a high level, which exceeds the range of the A/D conversion. Thereby, respective signal levels of these bright spot noises N1, N2 and N3 become all the same value at the full scale after A/D conversion, thereby failing to reflect actual signal levels thereof.

On the other hand, in the signal waveform of FIG. 18(B), there should be present the same bright spot noises N1 to N7 due to the dark signals as those existing in the FIG. 18(A), however, because the levels of these signals are contained within the A/D conversion range, they are converted to respective signal levels digitally corresponding to actual inputs thereof. From this FIG. 18(B), it is known that respective levels of the bright spot noises N1, N2 and N3 differ from each other actually.

Therefore, in a waveform which is generated by subtracting these signals, there appear arithmetic errors as indicated in FIG. 19, thereby causing a state in which respective signal levels at the portions where bright spots occurred are dropped extremely in inverse directions. These portions remain in a state like a black hole in an image produced appearing as if a dense colored pixel (hereinafter referred to as a black point).

As described hereinabove, according to the conventional noise reduction method, there is a problem that the bright spot noise due to the dark signal cannot be completely eliminated, allowing the effect of the bright spot noise to appear as black points in the image produced, thereby degrading its image quality.

The present invention has been contemplated in consideration of the problem described above, and its object is to provide an image capturing apparatus capable of eliminating the noise due to the dark signal from the solid-state imaging device.

Another object of the present invention is to provide a noise elimination method capable of eliminating the noise due to the dark signal from the solid-state imaging device.

DISCLOSURE OF THE INVENTION

In order to solve the above-mentioned problem, according to the present invention, an image capturing apparatus for capturing an object using a solid-state imaging device is provided, which comprises: subtraction means for subtracting, from first image data that is normally captured in an ordinary capturing mode with a shutter opened and digitalized, second image data that is captured with the shutter closed immediately before or after the above-mentioned ordinary capturing, under the same exposure condition as the ordinary capturing, and digitalized; bright spot position detection means for detecting an occurrence position of a bright spot noise, which is a high level noise which produces a bright spot on a captured image, in the second image data; and noise compensation means for compensating data at a pixel corresponding to the occurrence position of the bright spot noise detected by the bright spot position detection means, with respect to output data from the subtraction means.

In this image capturing apparatus, the subtraction means subtracts, from the first image data produced in the ordinary capturing mode with the shutter opened, the second image data that is produced by capturing immediately before or after the ordinary capturing under the same exposure condition as that of the ordinary capturing but with the shutter closed. The bright spot position detection means detects the occurrence position of the bright spot noise in the second image data. The noise compensation means compensates the data at the pixel corresponding to the occurrence position of the bright spot noise detected by the bright spot position detection means, for the output data from the subtraction means. Thereby, it becomes possible to detect easily and precisely the occurrence position of the bright spot noise in the output data from the subtraction means.

Further, according to the present invention, a noise elimination method for eliminating a noise occurring at the time of capturing an object using a solid-state imaging device is provided, the method comprises the steps of: subtracting, from first image data that is captured in an ordinary capturing mode with the shutter opened and digitalized, second image data that is captured immediately before or after the ordinary capturing described above under the same exposure condition as that of the ordinary capturing but with the shutter closed, and digitalized; detecting an occurrence position of a bright spot noise which is a high level noise which produces a bright spot on a captured image, in the second image data; and compensating a data at a pixel corresponding to the occurrence position of the bright spot noise detected, with respect to data obtained as a result of the subtraction.

In this noise elimination method, the occurrence position of the bright spot noise is detected from the second image data that is produced by capturing with the shutter closed immediately before or after the ordinary capturing in the state with the shutter opened, under the same exposure condition as the ordinary capturing. Then, for the image data obtained by subtracting the second image data from the first image data by the ordinary capturing, the data at the pixel corresponding to the occurrence position of the bright spot noise detected is compensated. Thereby, it becomes possible easily and precisely to detect the occurrence position of the bright spot noise in the image data obtained by the subtraction.

BEST MODE FOR CARRYING OUT THE INVENTION

The best mode for carrying out the present invention will be described by referring to the accompanying drawings in the following.

Figure 1:
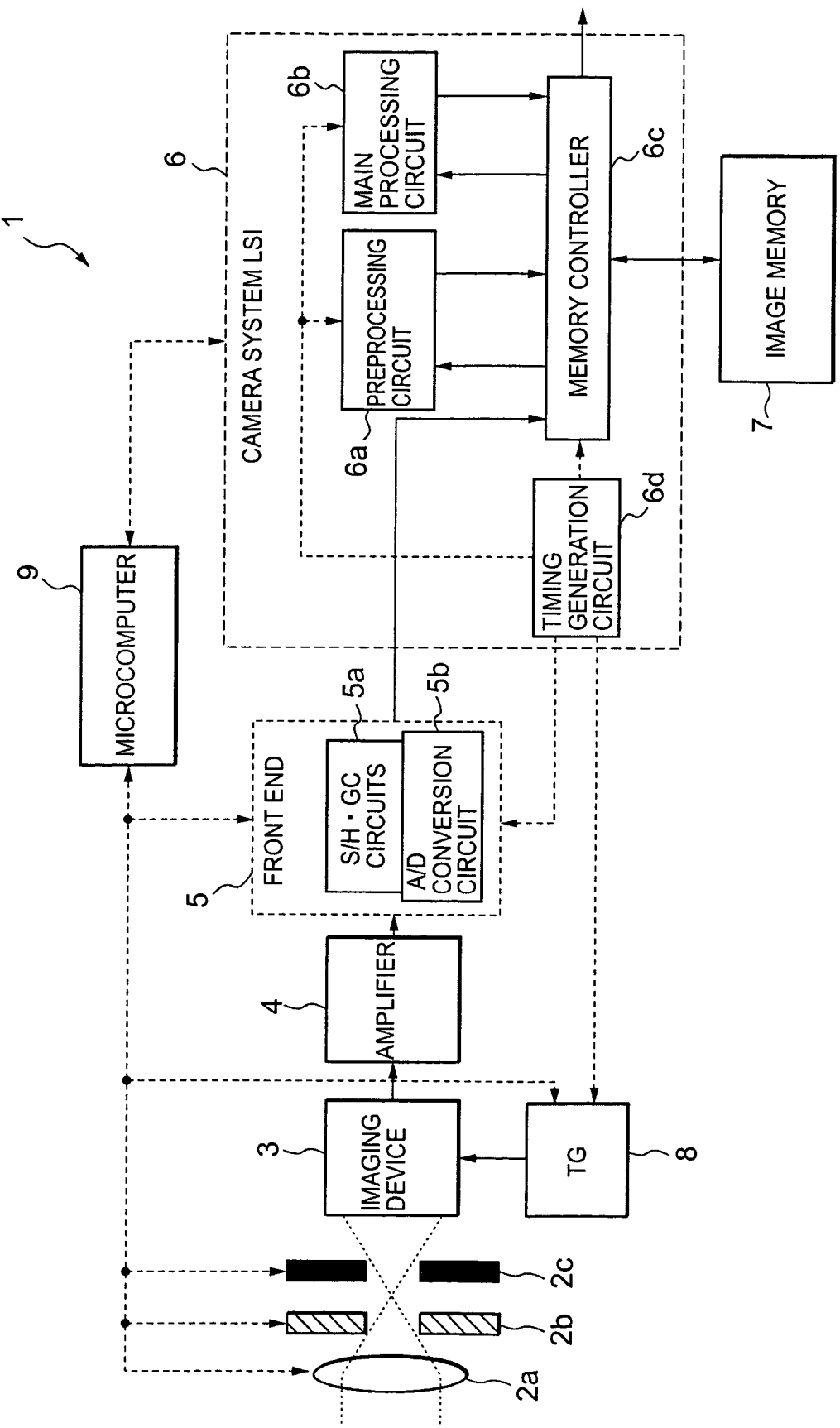
FIG. 1 is a block diagram showing an exemplary constitution of an image capturing apparatus according to the present invention.

FIG. 1 is a block diagram indicating an exemplary constitution of an image capturing apparatus according to the present invention.

An image capturing apparatus 1 shown in FIG. 1 is an apparatus for capturing an object to produce image data in a digital mode, and comprises: a lens 2a facing a light from the object, an iris 2b and a shutter 2c; an imaging device 3 provided for executing photoelectrical conversion of this light; an amplifier 4 for driving an analog image signal from the imaging device 3; a front end 5 for executing a process to convert the analog image signal to a digital data or the like; a camera system LSI 6 for executing a noise reduction processing, a color signal processing or the like for the image signal which is digitalized; an image memory 7 for storing an output image signal from the camera system LSI 6; a TG (Timing Generator) 8 for driving the imaging device 3; and a microcomputer 9 for controlling the overall apparatus.

The lens 2a which is movable along an axis of light converges the light from the object precisely on the imaging device 3. The iris 2b controls an amount of light to be supplied to the imaging device 3 by altering an area through which a converged light passes through. The shutter 2c controls exposure in. the imaging device 3 by shutting off transmission of light to be supplied to the imaging device 3. By the way, the function of the shutter 2c may be executed also by the iris 2b. The operations of the lens 2a, the iris 2b and the shutter 2c are controlled by the microcomputer 9.

The imaging device 3, which is constructed by integrating a large number of solid-state imaging elements, for example, CCDs, CMOS image sensors or the like, converts the light from the object to an electric signal to be outputted as an electric current value or a voltage value. The amplifier 4 supplies as an analog image signal to the front end 5, by driving an output signal from the imaging device 3.

The front end 5 comprises an S/H (Sample/Hold) • GC (Gain Control) circuit 5a and an A/D conversion circuit 5b. The S/H • GC circuit 5a executes a noise elimination processing for a so-called 1/F fluctuation noise or the like by applying a correlated double sampling to the analog image signal supplied via the amplifier 4, and further executes a gain adjustment if required. The A/D conversion circuit 5b converts the signal from the S/H • GC circuit 5a to a digital image signal, and supplies to the camera system LSI 6.

The camera system LSI 6 is provided with a preprocessing circuit 6a for executing a preprocessing such as a noise elimination processing for the image signal from the front end 5, a main processing circuit 6b for executing a main processing such as a color signal processing or the like, a memory controller 6c for controlling write or read of the image signal to and from the image memory 7, and a timing generation circuit 6d for generating a timing signal for each part.

The preprocessing circuit 6a executes a processing to eliminate the noise or the like generated by the imaging device 3 or the like by computing the image signal read out from the image memory 7. Here, as will be described later, after executing a subtraction processing between an ordinary image signal captured with the shutter opened and an image signal captured with the shutter closed, further a processing for compensating for a dense colored pixel (black point) appearing on a captured image due to an occurrence of a high level noise (bright spot noise) resulting from a dark signal is executed.

The main processing circuit 6b executes a processing for converting primary color signals of R/G/B (Red/Green/Blue) to a Y-color difference signal comprised of a luminance signal (Y) and two color difference signals (Cb/Cr), and also various processing such as pixel interpolation, compensation for frequency characteristics, computing of a Y signal matrix, a color difference matrix, and the like.

The memory controller 6c executes addressing to a buffer or to the image memory 7 for the image signal supplied, and responsive to control of the microcomputer 9, stores the image signal in an area specified on the image memory 7, and also reads out the image signal from a specified area to be outputted to the preprocessing circuit 6a and the main processing circuit 6b.

The timing generation circuit 6d generates a timing signal as a reference for operation of the front end 5, the camera system LSI 6, the TG 8, and the like.

The image memory 7, which is a semiconductor memory, for example, such as a DRAM (Dynamic Random Access Memory), SDRAM (Synchronous-DRAM) or the like, temporarily stores a digital image signal from the front end 5, the preprocessing circuit 6a and the main processing circuit 6b.

The TG 8 controls drive timing in horizontal and vertical directions in the imaging device 3. Further, in a case where the imaging device 3 has a fast/slow electronic shutter function, the TG 8 executes an exposure timing control for this function.

The microcomputer 9 is responsible for an overall control of the image capturing apparatus 1. For example, it executes a light exposure control through the iris 2b, an exposure time control for the shutter 2c by controlling to open and close, a gain control in the S/H • GC circuit 5a in the front end 5, operation control for the camera system LSI 6, control of the electronic shutter function for the imaging device 3 by the TG 8, and so on. Further, by these controls, the microcomputer 9 executes control of a normal capturing operation with the shutter 2c opened and a capturing operation with the shutter 2c closed to be executed immediately after the normal capturing operation, as well as controls of computation in the camera system LSI 6 associated with these operations, an image compensation processing, read and write to and from the image memory 7, and the like.

By the way, in the imaging device 3 used in this image capturing apparatus 1, an image signal outputted therefrom often contains such a noise due to a dark signal occurring in the imaging device 3 and/or a noise occurring in a circuit board or the like in the periphery thereof. Further, because an amount of occurrence of the dark signal depends on its exposure time and temperatures, if it is used under a long exposure time and/or high temperature environments, bright spots are likely to appear noticeably on a captured image due to the high level noise.

In order to eliminate these various noises, in the image capturing apparatus 1, at the time of normal capturing operation for capturing with the shutter 2c opened, immediately after that, a capturing operation in a state without altering the capturing conditions such as a light exposure, but only with the shutter 2c closed is carried out. Then, by use of these two different image signals thus generated, the camera system LSI 6 executes a processing to reduce the above-mentioned noises and compensate for the image quality.

In the following, the operation at the time of capturing in the image capturing apparatus 1 will be described.

When a request to start capturing is received via an input operation from the user, an aperture quantity by the iris and a shutter speed of the shutter 2c are adjusted under control of the microcomputer 9, and then the light from the object comes into the imaging device 3. The imaging device 3 under a drive timing control by the TG 8 executes a photoelectric conversion of the incident light to output an image signal A1.

The image signal A1 is supplied to the front end 5 via the amplifier 4. The front end 5 executes, in the S/H • GC circuit 5a, a correlated double sampling processing for the inputted image signal A1, then converts the image signal A1 to a digital signal in the A/D conversion circuit 5b. An image signal A2 obtained by the conversion to the digital signal is supplied to the camera system LSI 6, and the camera system LSI 6 temporarily stores the image signal A2 thus inputted in the image memory 7 via the memory controller 6c.

Subsequently, responsive to an instruction from the microcomputer 9, the shutter 2c is closed without altering the image capturing conditions such as gain controls in the iris 2b, the TG 8 and the front end 5. The imaging device 3 outputs an image signal B1 captured in a state with an incident light completely shut out. The image signal B1 from the imaging device 3 is sent to the front end 5 via the amplifier 4. The front end 5, in response to an instruction from the microcomputer 9, converts this image signal B1 through sampling thereof to an image signal B2 of a digital signal, to be supplied to the camera system LSI 6. The camera system LSI 6 stores the image signal B2 inputted in an area different from the area of the image signal A2 within the image memory 7, via the memory controller 6c.

Then, the camera system LSI 6 reads out the image signals A2 and B2 from the image memory 7, and supplies the same to the preprocessing circuit 6a. The preprocessing circuit 6a subtracts the image signal B2 from the image signal A2, and executes a compensation processing for an image signal C1 which was outputted as a result of the subtraction, for compensating for a black point on the image resulting from the bright spot noise due to the dark signal. An image signal C2 whose image quality is compensated is stored again in the image memory 7 via the memory controller 6c.

Subsequently, under control of the microcomputer 9, the image signal C2 is read out from the image memory 7, and supplied to the main processing circuit 6b. The main processing circuit 6b executes processing such as an interpolation processing for improving the image quality, a frequency characteristic compensation, color correction, γ correction and the like for the image signal C2 composed of, for example, a level value of each pixel of R/G/B and the like, so as to convert into an ordinary image data format including a luminance signal (Y) and a color difference signal (Cb/Cr). An image signal D thus converted is stored in the image memory 7 via the memory controller 6c.

Figure 2:
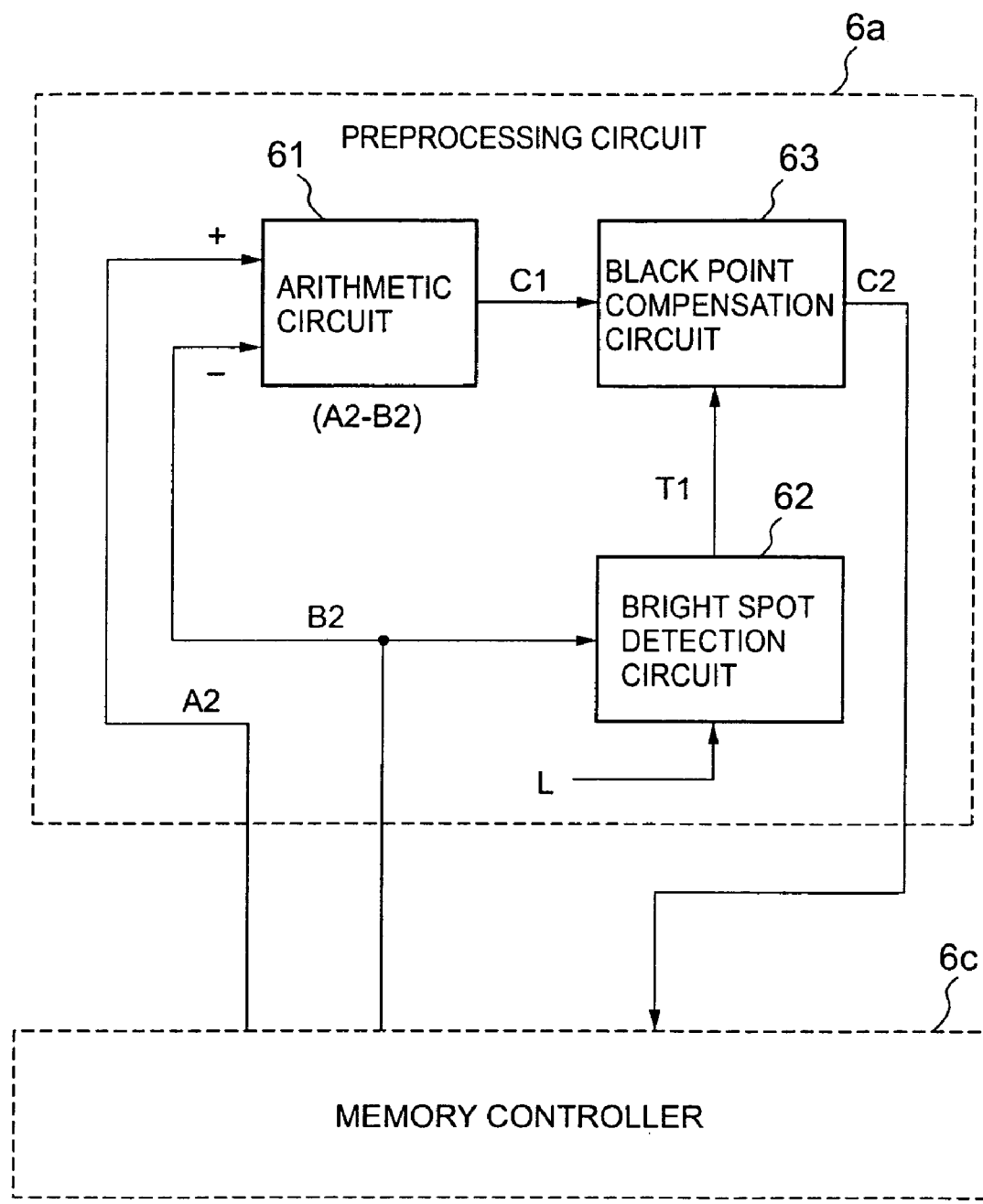
FIG. 2 is a diagram showing an exemplary internal constitution of a preprocessing circuit.

In the next, processing in the preprocessing circuit 6a within the camera system LSI 6 will be described in detail. FIG. 2 is a diagram showing an exemplary internal constitution of the preprocessing circuit 6a.

As shown in FIG. 2, the preprocessing circuit 6a comprises: an arithmetic circuit 61 for subtracting each signal at each pixel corresponding in the image signal B2 from each signal at each pixel in the image signal A2; a bright spot detection circuit 62 for detecting the position of a bright spot from the image signal B2; and a black point compensation circuit 63 for compensating the signal of the pixel at the black point in the image signal C1 outputted from the arithmetic circuit 61, on the basis of a result of detection in the bright spot detection circuit 62.

The image signal A2 read out from the image memory 7 via the memory controller 6c is supplied to the arithmetic circuit 61, and the image signal B2 is supplied to the arithmetic circuit 61 as well as to the bright spot detection circuit 62. The arithmetic circuit 61, by sequentially subtracting an image signal B2 of each pixel corresponding therein from image signal A2, outputs the image signal C1 from which only a component of a fixed pattern noise is eliminated. At this instant, there is a case in which the image signal C1 is not completely free from the influence of the bright spot noise, and in this case, allowing for the black point noise to remain.

The bright spot detection circuit 62 detects a position of a pixel at which the bright spot noise has occurred from the image signal B2 supplied on the basis of a signal level L predetermined as will be described later, and outputs a timing pulse T1. The black point compensation circuit 63, with respect to the image signal C1 outputted from the arithmetic circuit 61, determines a position of the pixel at which the black point noise exists on the basis of the timing pulse T1 from the bright spot detection circuit 62, and compensates for this pixel using the signal of a pixel having the same color in the vicinity thereof.

Figure 3:
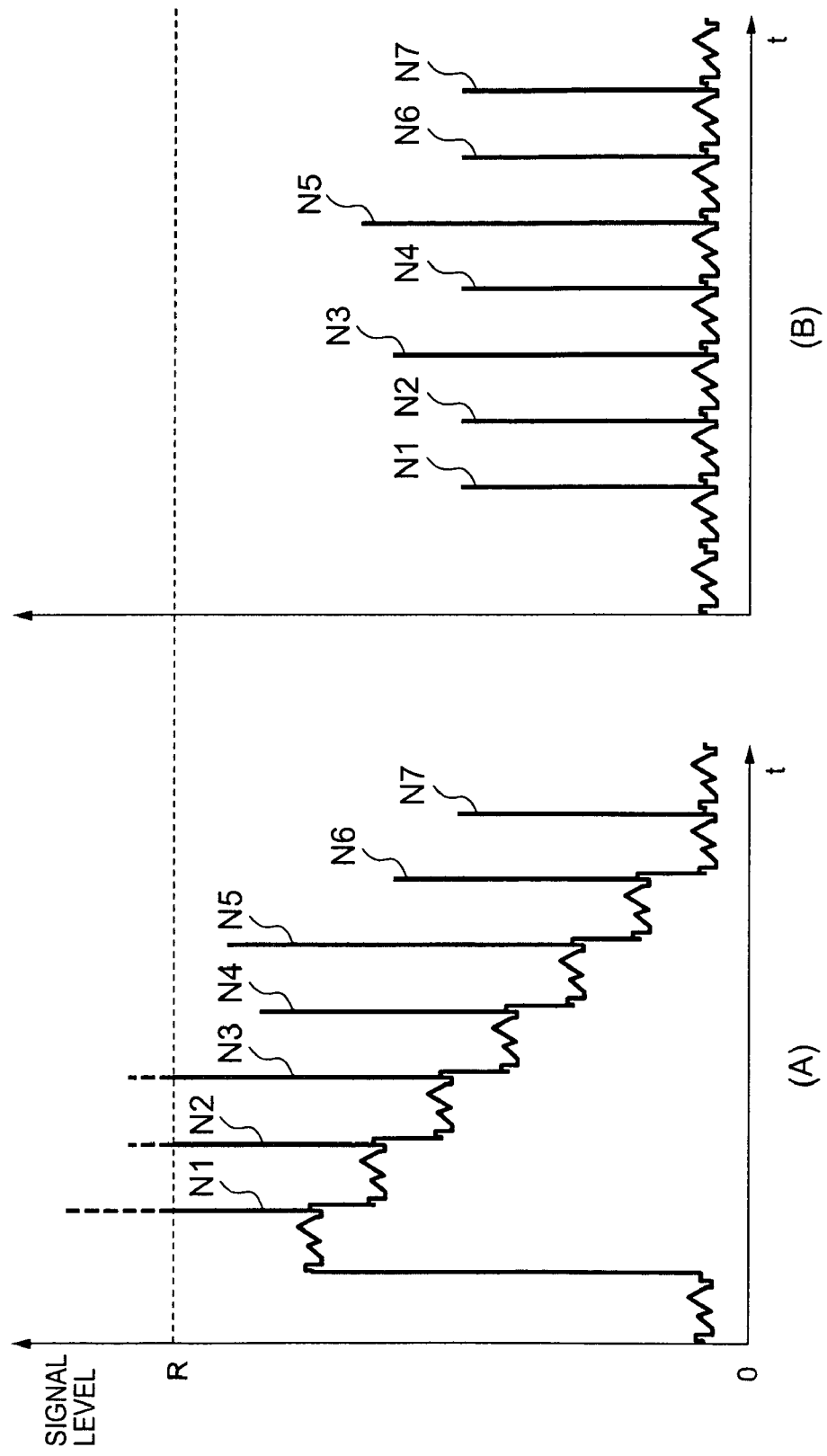
FIG. 3 is a diagram showing examples of waveforms of respective image signals to be inputted to a computing unit.

Here, with reference to exemplary signal waveforms at respective parts, the black point compensation processing will be described in detail. FIG. 3 is a diagram showing examples of respective waveforms of image signals A2 and B2 to be inputted to the arithmetic circuit 61.

FIG. 3(A) shows an exemplary waveform of image signal A2 captured by an ordinary capturing operation and digitalized. This signal contains, in addition to image information of the object, a noise component due to a dark signal generated by the imaging device 3, and a fixed pattern noise resulting from a noise or the like generated on a circuit board or the like, in the periphery thereof. Depending on a level of the fixed pattern noise, although there is such a case where a direct current offset occurs in the signal, in this image signal A2, an offset also occurs. Further, as a cause of noise due to the dark signal, a large amount of charges are generated because of structural defects in the imaging device 3 or manufacturing variations or the like, thereby containing bright spot noises N1 to N7 that would produce bright spots on the captured image.

Further, in FIG. 3, a maximum value of a convertible range in the A/D conversion circuit 5b within the front end 5 is indicated by a dotted line R. The A/D conversion circuit 5b converts for all pixels having a signal level higher than this range R as the same value at the full scale, and digitalizes accordingly.

In the signal waveform of FIG. 3A, it is shown that with respect to the image signal A1 outputted from the imaging device 3, actual signal levels of bright spot noises N1, N2 and N3 exceed the range R, and with respect to the image signal A2 digitally converted, the levels of these bright spot noises N1, N2 and N3 reach the full scale within the range R. That is, with respect to the image signal A2 digitally converted, the bright spot noises N1, N2 and N3 do not reflect their signal levels actually occurred.

On the other hand, FIG. 3(B) shows an example of waveforms of image signal B2 which was captured immediately after the ordinary capturing, with the shutter closed and converted to a digital data. This image signal B2 does not contain any image signal of the object, but contains exclusively noise components such as a noise resulting from the dark signal by the imaging device 3, occurring on the circuit board or the like, a fixed pattern noise such as a direct current mode offset or the like, and of the bright spot noises N1 to N7. By the way, in FIG. 3(B), the same reference numerals are labeled to respective bright spot noises corresponding to exemplary signal waveforms in FIG. 3(A).

Here, it is known that an amount of occurrence of the dark signal to be generated in the imaging device 3 becomes constant, if a capturing condition such as exposure time or the like, and an environmental condition such as temperature or the like are the same. Therefore, in the image signal B2 having been captured with the shutter closed immediately after the normal capturing of the image signal A2, original signal levels actually have occurred are reproduced for those signal levels of the bright spot noises N1, N2 and N3 which reached the full scale within the range R in the image signal A2.

The arithmetic circuit 61, by sequentially subtracting each image signal B2 for each pixel corresponding therein from the image signal A2, outputs an image signal C1 from which only the component of the fixed pattern noise is eliminated. Further, in the arithmetic circuit 61, the bright spot noises N4, N5, N6 and N7 the original signal levels of which are smaller than the range R are also removed. However, as for the bright spot noises N1, N2 and N3 in the image signal A2 which actually do not reflect their original signal levels, because there occurred a difference in the signal levels between the image signals A2 and B2, in the image signal C1 conversely they appear as black point noises N11, N12 and N13 exclusively at which pixels their signal levels drop extremely.

Figure 4:
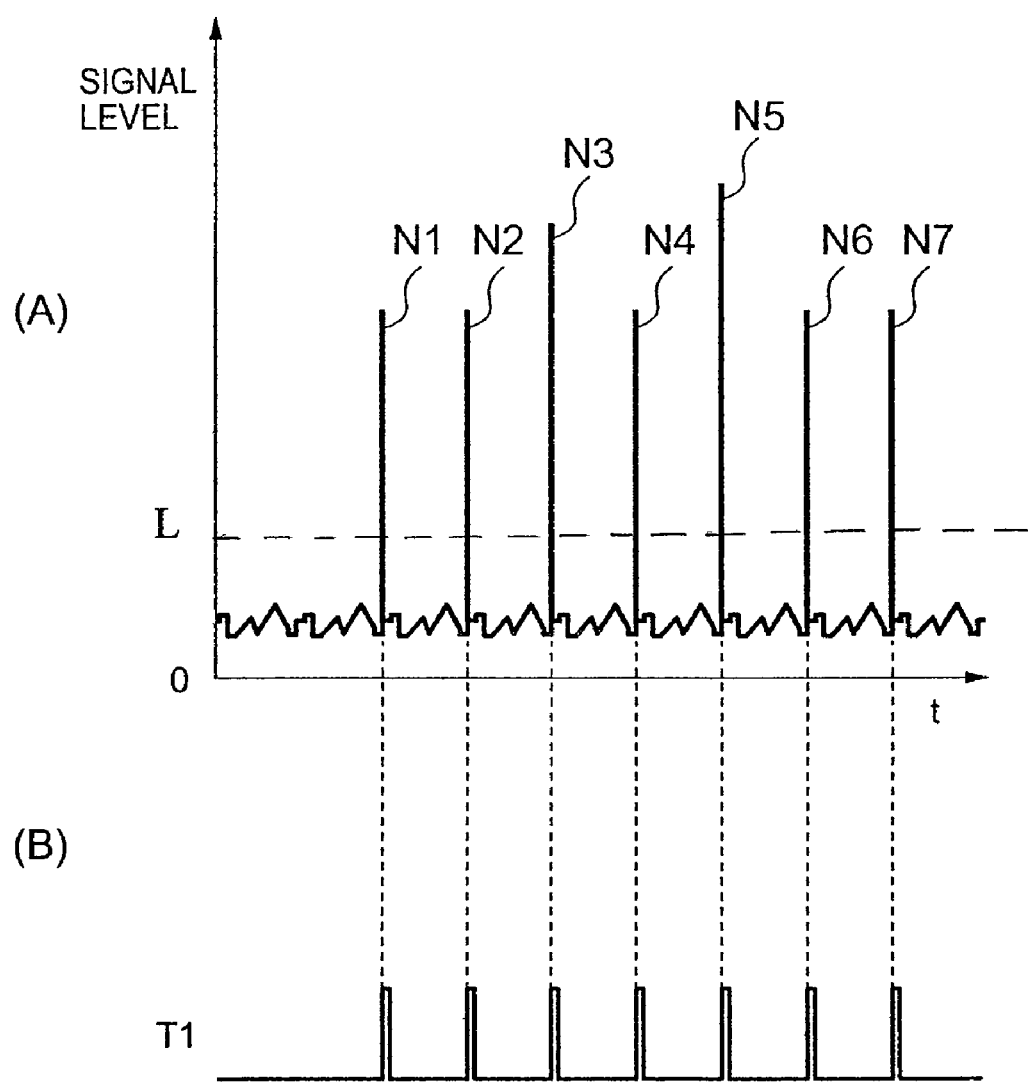
FIG. 4 is a diagram showing a relationship between the image signals captured with the shutter closed and respective timing pulses.

In order to remove these black point noises N11, N12 and N13, the bright spot detection circuit 62 detects an occurrence position of the bright spot noises N1, N2 and N3 from the image signal B2 and outputs a timing pulse T1 at this position detected. Here, FIG. 4 is a diagram indicating a relationship between the image signal B2 and the timing pulse T1.

As described above, in the image signal B2, the signal levels of the noise components are reflected precisely. Further, as shown in FIG. 4(A), because the image signal B2 is captured in the state with the shutter closed thus interrupting the incident light thereby not containing any image component of the object, it is in a mode of signal from which only the bright spot noises N1 to N7 can be separated easily.

Thereby, the bright spot detection circuit 62, using the image signal B2, detects a position of a pixel at which each of the bright spot noises N1 to N7 appears. Because the bright spot noises N1 to N7 have a signal level which is extremely higher in comparison with other noises, the bright spot detection circuit 62 sets up a signal level L arbitrarily so as to function as a threshold value in detection of the bright spot noise N1 to N7. Then, as shown in FIG. 4(B), by comparing respective signal levels of respective pixels in the image signal B2 with this signal level L, and by outputting a timing pulse T1 in a case if they reach the signal level L, respective positions of the bright spot noises N1 to N7 are detected.

Figure 5A:
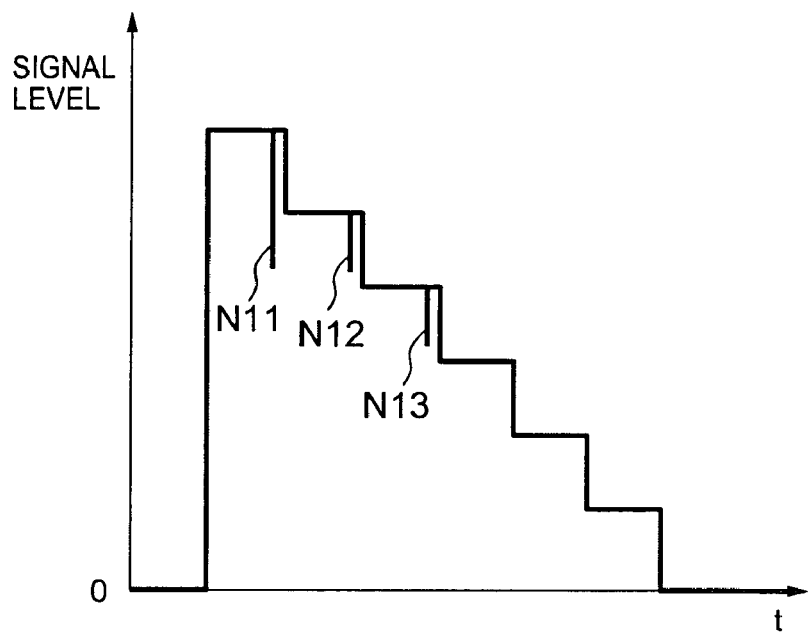
FIGS. 5A to 5B are diagrams showing exemplary waveforms for explaining compensation of a black point noise.
Figure 5B:
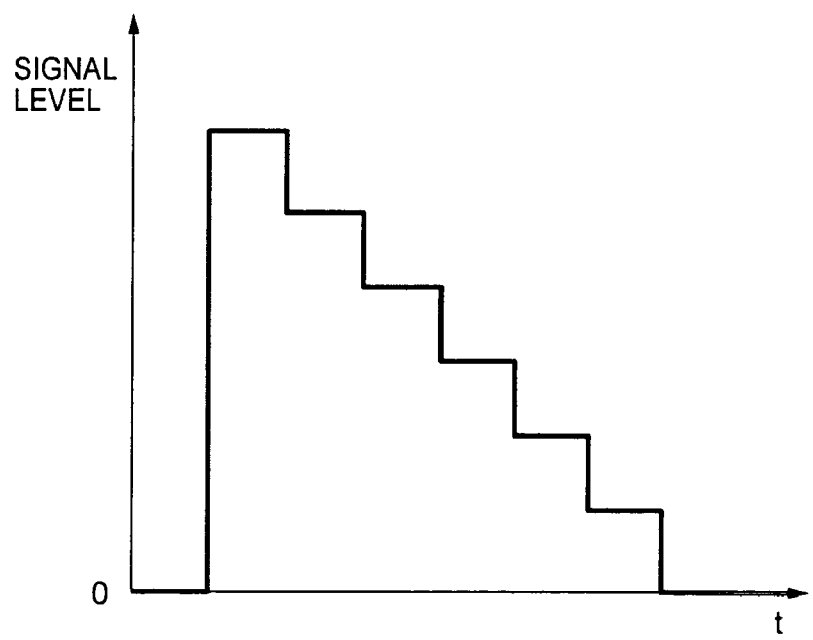

In the next, in FIGS. 5A to 5B, exemplary waveforms are shown for explaining a black point noise compensation.

FIG. 5A shows an exemplary waveform of the image signal C1 outputted from the arithmetic circuit 61. In this image signal C1, as described above, in respective pixels corresponding to the bright spot noises N1, N2 and N3 the signal levels of which reach the full scale within the range R in the image signal A2, there appear black point noises N11, N12 and N13.

The black point compensation circuit 63 sequentially receives an input of the image signal C1 from the arithmetic circuit 61, and upon receiving a timing pulse T1 from the bright spot detection circuit 62, it compensates for a signal of a particular pixel in the image signal C1 inputted at this instant with a signal of another pixel in the vicinity thereof. More specifically, the signal of the corresponding pixel is replaced with the use of a signal of a pixel adjacent thereto having the same color, for example, in either a preceding or a subsequent pixel. Alternatively, by averaging two signals of the preceding and the subsequent pixels adjacent thereto, the signal of the corresponding pixel is replaced with the obtained mean value. Through such pixel compensation processing, the pixel appearing as a black point resembling a black hole on the captured image is filled in with the color in the vicinity thereof so as to appear unnoticeable thereby preventing degradation of the image quality.

In the next, an exemplary internal constitution of each part in the preprocessing circuit 6a will be described. Firstly, FIG. 6 is a diagram showing a first exemplary internal constitution of the arithmetic circuit 61.

Figure 6:
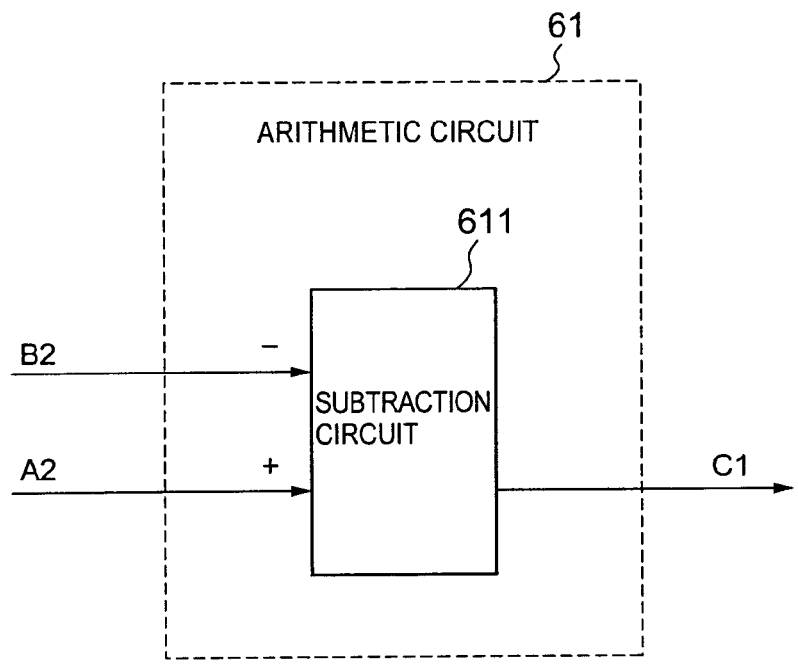
FIG. 6 is a diagram showing a first exemplary internal constitution of the computing unit.

As shown in FIG. 6, the arithmetic circuit 61 consists only of a subtraction circuit 611. The subtraction circuit 611 outputs an image signal C1 obtained by subtracting an image signal B2 from an inputted image signal A2.

In the case of this first exemplary internal constitution, for example, if both of the inputted signals are 10-bit data with no code, a result of computation becomes a 10-bit data with a code, thereby resulting in an increased bit width by one bit. More specifically, for example, as a consequence of the subtraction there may be a case where a negative signal occurs due to an irregular noise or the like, however, if the negative signal is removed in order to prevent the bit width from changing, because the noise in the vicinity of the black color is subject to a half-wave rectification, an average direct current level or an average voltage level in the neighborhood of the black color is caused to change.

Figure 7:
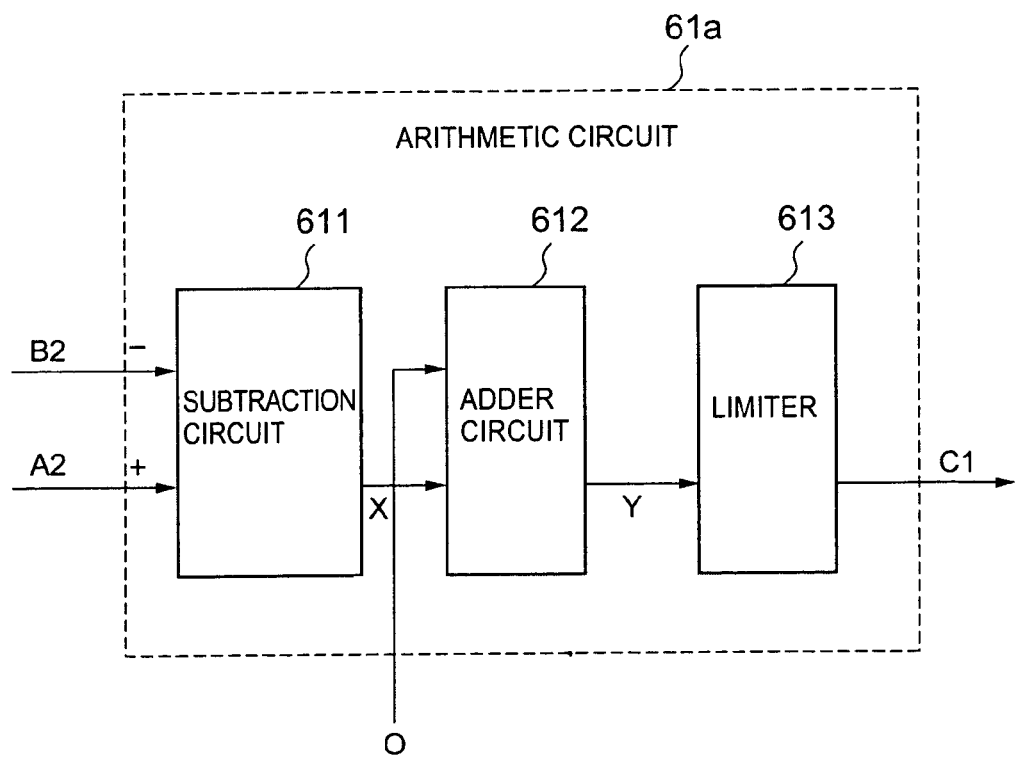
FIG. 7 is a diagram showing a second exemplary internal constitution of the computing unit.

Against this, in the next, an exemplary internal constitution for preventing such a change in the bit width of the image signal will be described. FIG. 7 is a diagram showing a second exemplary internal constitution of the arithmetic circuit 61. By the way, in FIG. 7, function blocks having the same construction as in the first exemplary internal constitution shown in FIG. 6 are labeled with the same reference numerals.

An arithmetic circuit 61a shown in FIG. 7 comprises, in addition to the subtraction circuit 611 described above, an adder circuit 612 for adding offset, and a limiter 613 for limiting a signal level. The adder circuit 612 adds an offset signal O having a direct current signal level sufficient to be transmitted as to a negative noise component contained in an output signal X from the subtraction circuit 611. Further, the limiter 613 limits a signal level of an output signal Y which was offset by the adder circuit 612 so that it holds the original bit width thereof.

Figure 8:
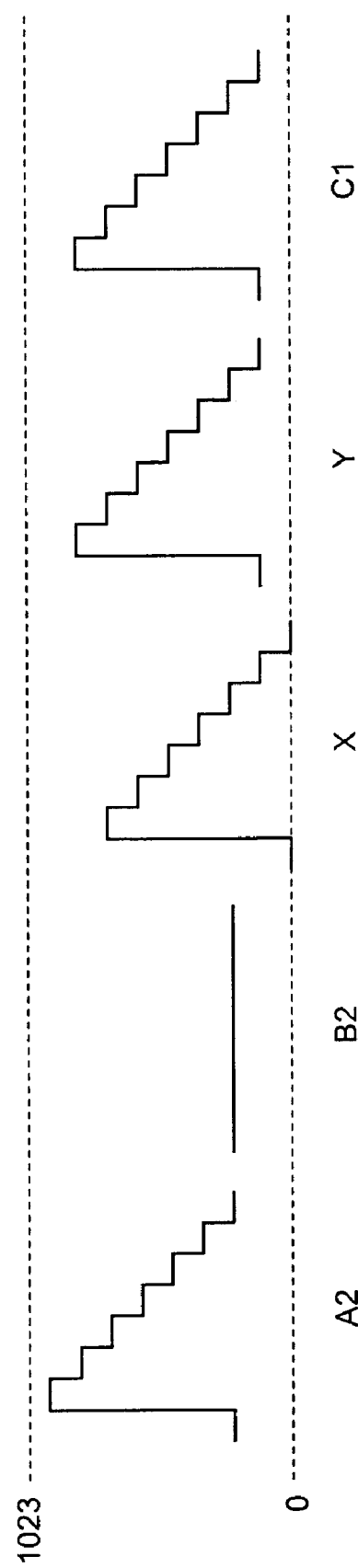
FIG. 8 is a diagram describing respective signal levels at respective portions in the second exemplary internal constitution of the computing unit by way of example using 10-bit digital data.

Here, FIG. 8 is a diagram showing respective signal levels in respective parts in the arithmetic circuit 61a by way of example of 10-bit digital data. By the way, in FIG. 8, waveforms of minute noise components such as of the bright spot noise and the like are omitted for simplifying the description.

In FIG. 8, relative to the image signals A2 and B2 to be inputted into the subtraction circuit 611, an output signal X from the subtraction circuit 611, in which the fixed pattern noise was removed, may sometimes contain a negative noise component. Further, in an output signal Y from the adder circuit 612, an offset, for example, of "32" data is added to the output signal X. As a result, the output signal Y becomes 11 bit data attached with a code, then in the limiter 613, by causing a negative signal level to be "0", and a signal level in excess of "1023" which is a value of the maximum range width of the 10-bit data to be "1023", an image signal C1 to be outputted becomes a 10-bit data with no code.

According to the second exemplary internal constitution described above, it becomes possible to transmit the output signal X from which the fixed pattern noise was removed in a limited number of bits and without degrading the image quality.

Figure 9:
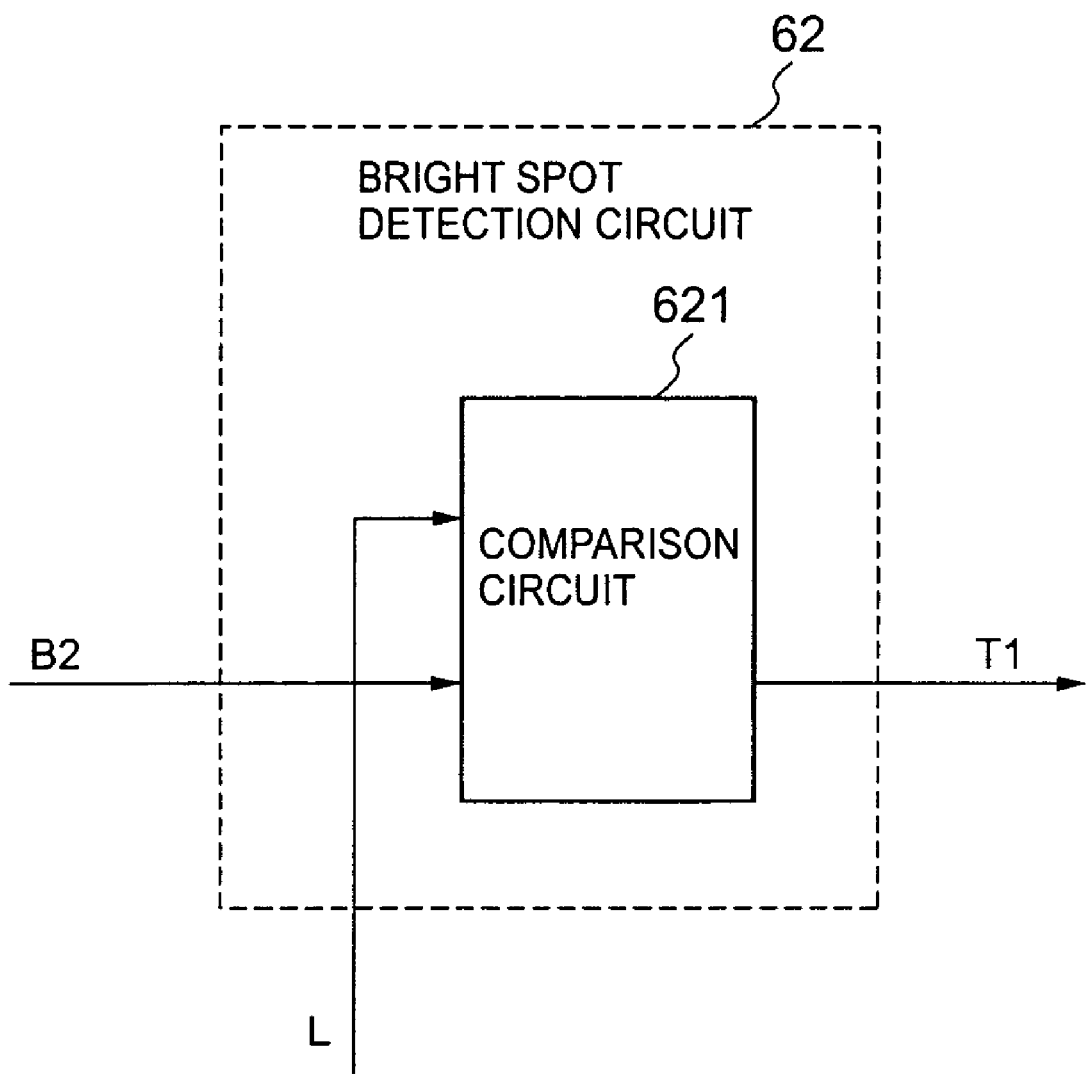
FIG. 9 is a diagram showing a first exemplary internal constitution of a bright spot detection circuit.

In the following, an exemplary internal constitution of the bright spot detection circuit 62 will be described. FIG. 9 is a diagram showing a first exemplary internal constitution of the bright spot detection circuit 62.

As shown in FIG. 9, the bright spot detection circuit 62 is composed of a comparator circuit 621 for comparing a signal level of the inputted image signal B2 with a preset value, and outputs a result of the comparison as a timing pulse T1. A signal level L as a reference of comparison is set by the microcomputer 9. In addition, a timing pulse T1 to be outputted when a signal level of the image signal B2 is higher than this signal level L upon comparison is defined to be at H level.

According to this first exemplary internal constitution, in a case where the signal level of the image signal B2 exceeds the set-up signal level L, it detects presence of a bright spot noise, and by setting the timing pulse T1 at the H level, notifies the black point compensation circuit 63 of this presence. However, according to this internal constitution, in the case if an amount of a direct current mode offset contained in the inputted image signal B2 is large, an error may occur when determining the level of a bright spot noise.

Figure 10:
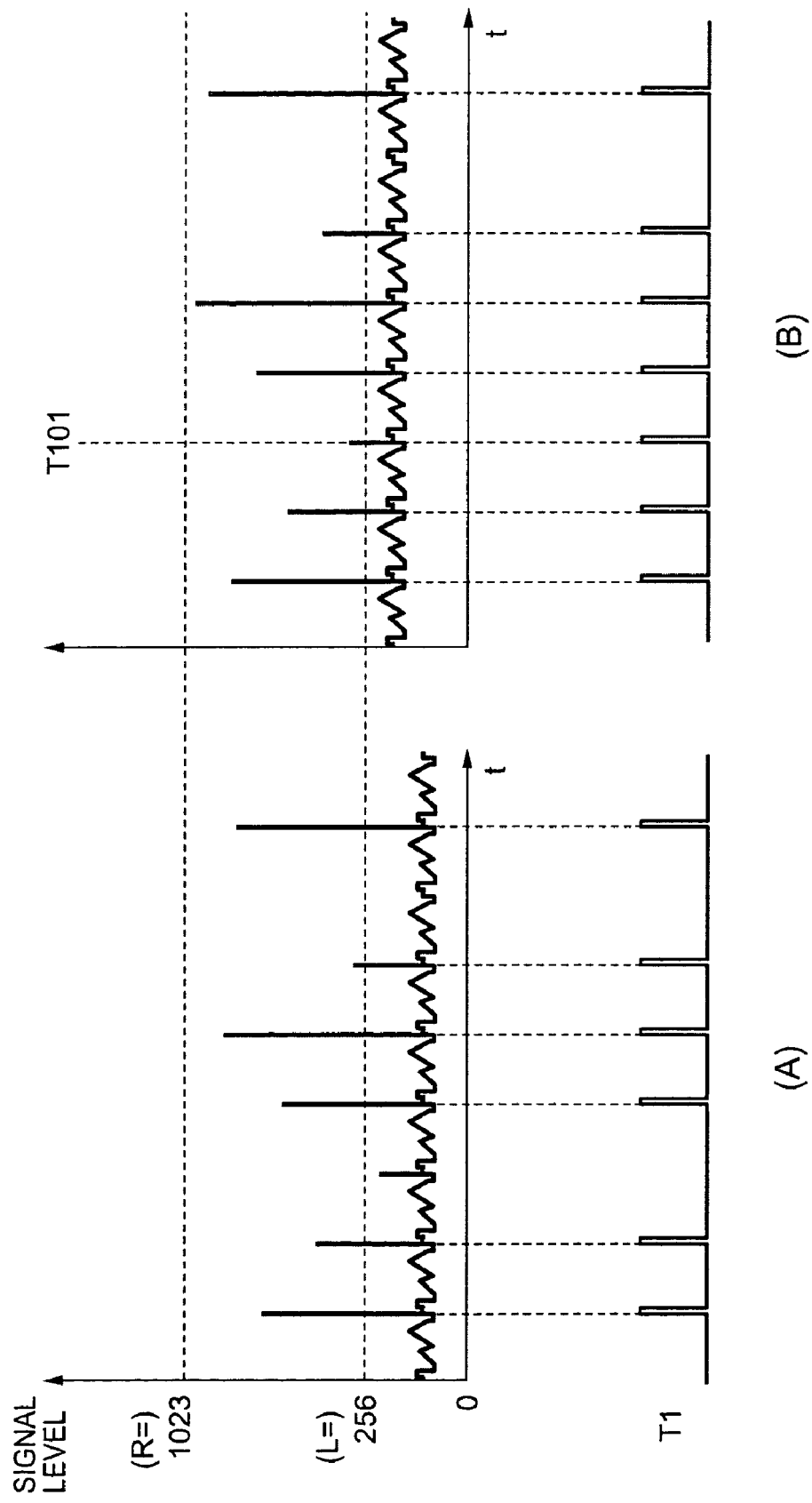
FIG. 10 is a diagram showing a different mode of detection of the occurrence position of a bright spot noise for two image signals having a different offset level.

Here, FIG. 10 is a diagram showing a manner of detection of occurrence positions of bright spot noises for two different image signals B2 having a different offset level.

In FIGS. 10(A) and (B), it is assumed that as an example, both image signals B2 are 10 bits with no code, a signal of the signal level L provided by the microcomputer 9 is 10 bits with no code, and a preset value of the signal level L is 256.

Further, these two image signals B2 are indicated in conjunction with respective output modes of timing pulses T1 associated therewith.

In the case of FIG. 10(A), six positions of bright spot noises are detected relative to the value of the signal level L for use in detection of the bright spot noise, and respective timing pulses T1 corresponding thereto are set at H level. In contrast, in the case of FIG. 10(B) where its offset level is higher than that of FIG. 10(A). Thereby, because a relatively low level noise occurring at a timing T101 exceeds the signal level L, seven positions including this noise have been determined as the bright spot noises.

As described hereinabove, according to the first exemplary internal constitution, depending on its offset level contained in the image signal B2 to be inputted to the bright spot detection circuit 62, there sometimes occurs an error in determination with regard to bright spot noise detection. For example, in such a case where an exposure period of time becomes longer or an environmental temperature rises, because this offset level will further increase, depending on a set-up condition of the signal level L for use in detection thereof, there may be a case that a bright spot noise is determined to be present for every pixel.

Figure 11:
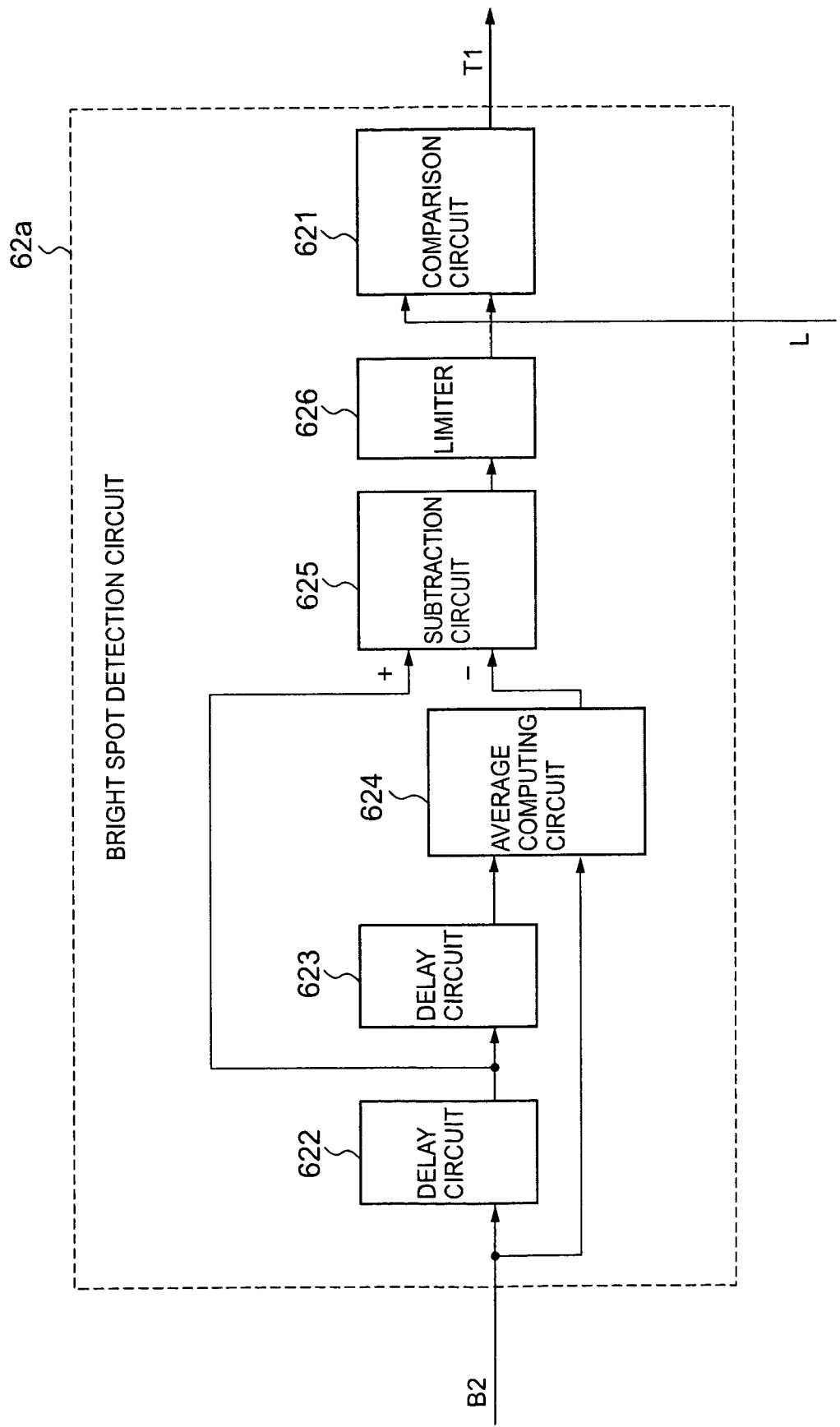
FIG. 11 is a diagram showing a second exemplary internal constitution of the bright spot detection circuit.

An exemplary internal constitution that can prevent such a determination error will be described in the following. Firstly, FIG. 11 is a diagram showing a second exemplary internal constitution of the bright spot detection circuit 62. By the way, in FIG. 11, function blocks having the same construction as in the first exemplary internal constitution shown in FIG. 9 are labeled with the same reference numerals.

A bright spot detection circuit 62a shown in FIG. 11 comprises a delay circuit 622 for delaying an inputted image signal B2, a delay circuit 623 for further delaying an output signal from the delay circuit 622, an average computing circuit 624 for computing an average level value of the delay circuit 623 and the image signal B2, a subtraction circuit 625 for subtracting an output signal of the average computing circuit 624 from the output signal of the delay circuit 622, a limiter 626 for limiting a negative component contained in an output signal from the subtraction circuit 625, and a comparator circuit 621 similar to that in the first exemplary internal constitution for outputting a timing pulse T1 upon detecting a bright spot noise from an output signal of the limiter 626.

The delay circuits 622 and 623 are composed of a delay element such as a D flip-flop or the like, and a number of stages of the delay element are provided in one or two stages. Thereby, relative to the image signal B2 supplied from the memory controller 6c, an output signal from the delay circuit 622 is delayed by one pixel, and an output signal from the delay circuit 623 is further delayed by one pixel. Thereby, in the bright spot detection circuit 62a, it is arranged so that an output signal from the delay circuit 622 is set as an object signal for use in detection of the bright spot noise, a signal of a preceding pixel prior to the object pixel is read out from the output signal from the delay circuit 623, and a signal of a subsequent pixel following thereto is read out from the inputted image signal B2 to the delay circuit 622.

By the way, the number of stages of the delay element in the delay circuits 622 and 623, as will be described later, is determined depending on its device construction in the imaging device 3.

The average computing circuit 624 computes an average value of signal level between an output signal from the delay circuit 623 and the inputted image signal B2. Thereby, a mean value of the signal levels is obtained for the preceding and following pixels adjacent to the object pixel for detection. The subtraction circuit 625 subtracts the signal of the average computing circuit 624 from the signal of the object for detection supplied from the delay circuit 622. Thereby, a difference between the pixel of the object for detection and the average signal level of the pixels on the both sides adjacent thereto is outputted.

The limiter 626 cancels a negative signal generated by computation in the subtraction circuit 625 to output this signal level as "0". Thereby, increase of the bit width of the data due to an occurrence of the negative signal can be avoided. Then, this output signal is inputted to a comparator circuit 621, compared with the signal level L of the detection reference, then a timing pulse T1 is outputted accordingly.

Figure 12:
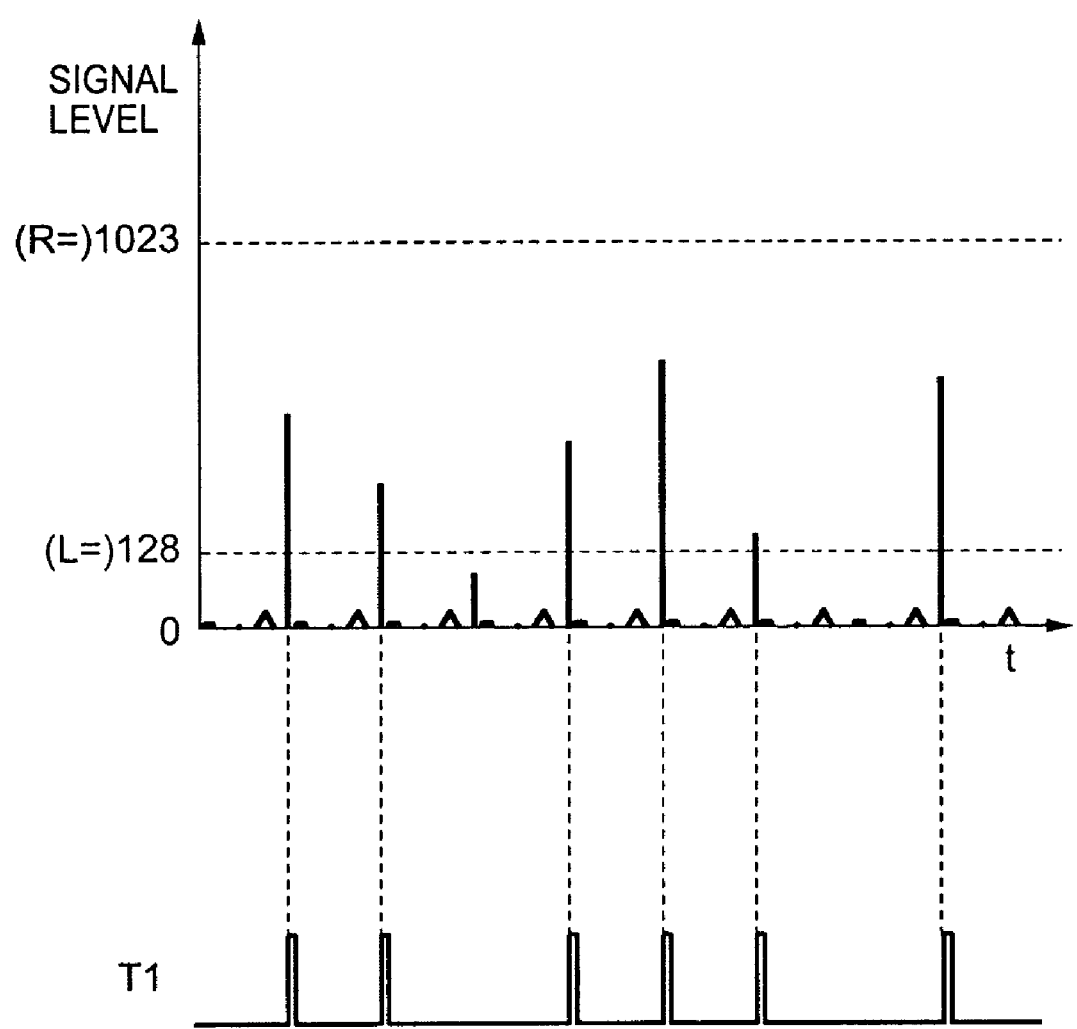
FIG. 12 is a diagram showing a relationship between the bright spot noise detection and respective timing pulse outputs in a comparison circuit in the second exemplary internal constitution.

Here, FIG. 12 is a diagram showing a relationship between the detection of bright spot noises in the comparator circuit 621 according to the second exemplary internal constitution and the output of timing pulses T1.

In FIG. 12, it is set as an example such that an input signal S to the comparator circuit 621 is 10 bits with no code, a signal of signal level L given by the microcomputer 9 is 10 bits with no code, and a preset value of the signal level L is 128. The input signal S is a difference signal between that of the object pixel for detection and the average signal level of the juxtaposed pixels on both sides thereof, from which the negative signal is removed. Therefore, for example, as shown in FIGS. 10(A) and (B), whatever offset value the image signal B to be inputted to the bright spot detection circuit 62 may have, the input signal S to the comparator circuit 621 is in a state with this offset component removed.

Thereby, by use of this input signal S and execution of comparison with the signal level L as the detection reference, it becomes unnecessary to increase the signal level L as the detection reference to a higher level in order to prevent an error detection of the bright spot noise depending on the offset, thereby ensuring for the detection of the bright spot noise to be executed precisely irrespective of the offset level.

By the way, according to the second exemplary internal constitution described above, by use of the pixels juxtaposed on both sides of the object pixel for detection, the average level therebetween was subtracted from that of the object pixel, however, it is not limited thereto, and even by use of a pixel level of only one of these juxtaposed pixels, the same effect as above can be obtained. In the following, such an exemplary internal constitution of the bright spot detection circuit 62 will be described.

Figure 13A:
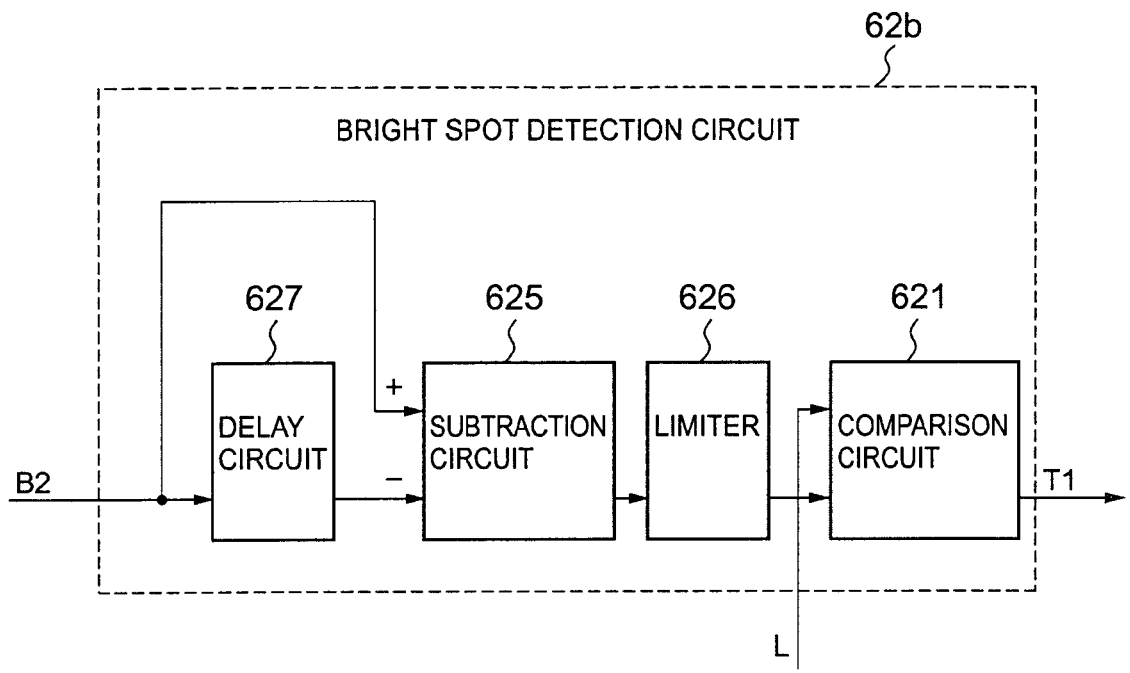
FIGS. 13A to 13B are diagrams showing a third and a fourth exemplary internal constitutions of the bright spot detection circuit.
Figure 13B:
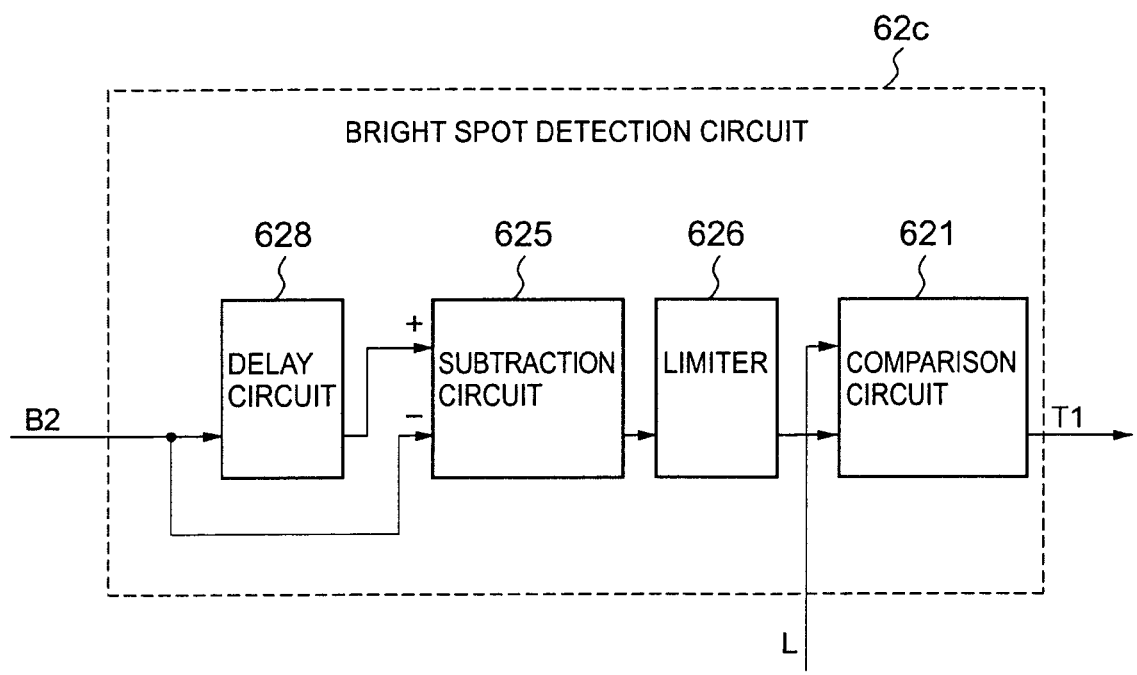

FIGS. 13A to 13B are diagrams showing a third and a fourth exemplary internal constitutions of the bright spot detection circuit 62.

By the way, in FIGS. 13A to 13B, function blocks having the same construction as in the first and the second exemplary internal constitutions shown in FIGS. 9 and 11 are labeled with the same reference numerals.

In FIG. 13A, as the third exemplary internal constitution, there is shown a bright spot detection circuit 62b which detects a bright spot noise by use of a difference between an object pixel and a preceding pixel juxtaposed thereto. This bright spot detection circuit 62b comprises a delay circuit 627 for delaying an inputted image signal B2, a subtraction circuit 627 for subtracting an output signal of the delay circuit 627 from the image signal B2, a limiter 626 for removing a negative component from an output signal therefrom, and a comparison circuit 621 for performing a detection of a bright spot noise.

The delay circuit 627 which is provided with one or two stages of delay elements such as a D flip-flop or the like delays the inputted image signal B2 by a portion corresponding to one pixel. Therefore, in the subtraction circuit 625, a signal of a pixel preceding by one pixel from the delay circuit 627

(normally on the left side) is subtracted from the signal of the object of detection, and this output signal is supplied to the comparison circuit 621 via the limiter 626.

Further, in FIG. 13B, as the fourth exemplary internal constitution, there is shown a bright spot detection circuit 62c which detects a bright spot noise by use of a difference between the object pixel and a subsequent pixel juxtaposed thereto. This bright spot detection circuit 62c comprises a delay circuit 628 for delaying an inputted image signal B2, a subtraction circuit 625 for subtracting the inputted image signal B2 from an output signal of the delay circuit 627, a limiter 626 for removing a negative component from an output signal therefrom, and a comparison circuit 621 for detecting a bright spot noise.

In this bright spot detection circuit 62c, the signal delayed by one pixel in the delay circuit 628 becomes an object for detection of bright spot noises. Thereby, in the subtraction circuit 625, the signal of a pixel subsequent thereto by one pixel (usually on the right-hand side thereof) is subtracted from the signal of the object for detection, and this output signal is supplied to the comparison circuit 621 via the limiter 626.

According to the third and the fourth exemplary internal constitutions described above, because comparison of the signal levels is performed by use of a difference between the signal of the pixel of the object for detection and the signal of the pixel juxtaposed thereto, it is enabled precisely to detect the bright spot noise irrespective of the offset level that the image signal B2 to be inputted has.

By the way, according to the second and the fourth exemplary internal constitutions, because a signal one pixel after the signal of the detection object is used, a timing pulse T1 to be outputted is assumed to be delayed by one pixel with respect to the image signal B2. Thereby, in the case where the second and the fourth exemplary internal constitutions are adopted, a delay circuit for delaying a signal by one pixel is provided at an input stage of the image signals A2 and B2 for the arithmetic circuit 61, or between the arithmetic circuit 61 and the black point compensation circuit 63.

Figure 14:
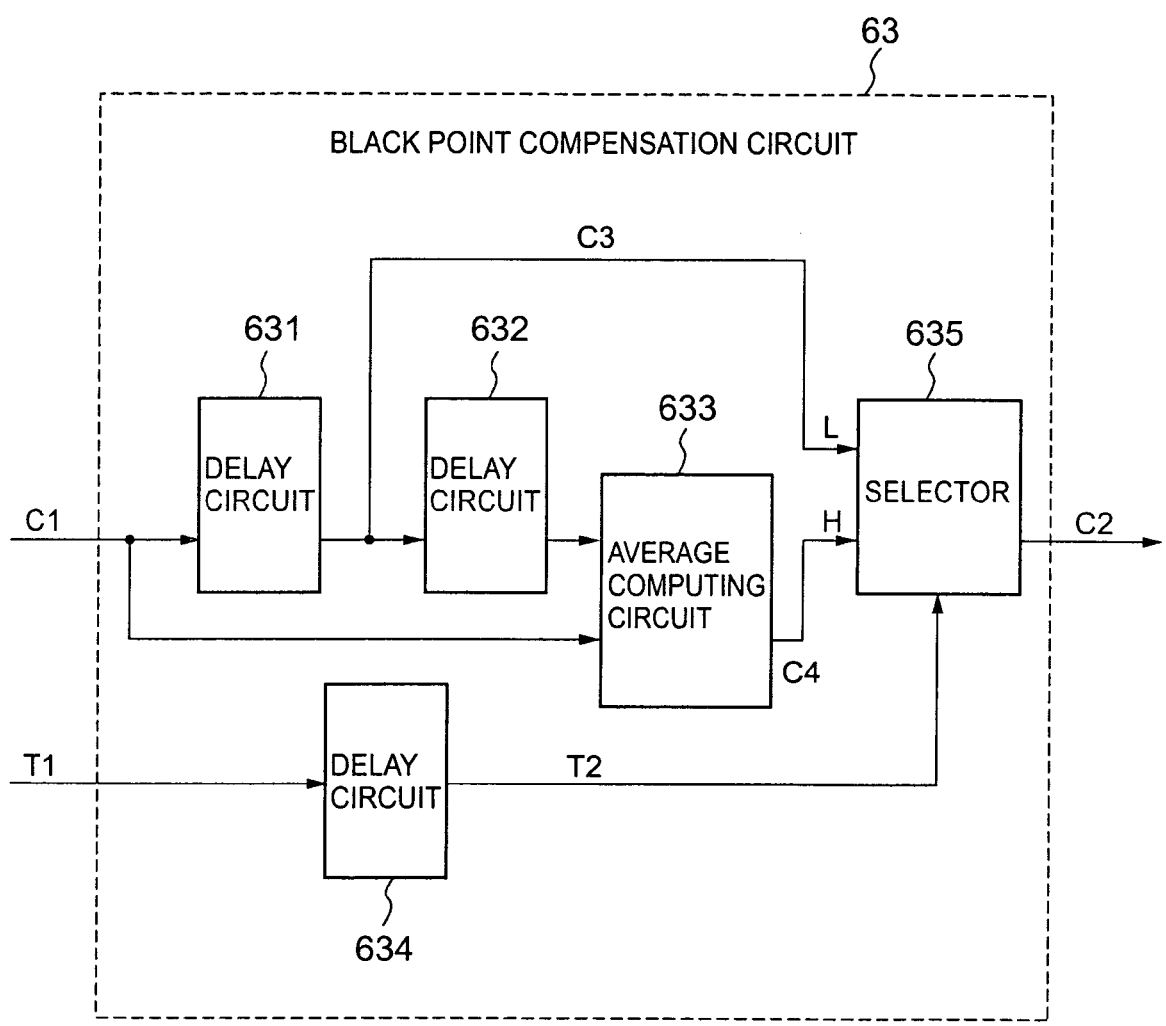
FIG. 14 is a diagram showing a first exemplary internal constitution of a black point compensation circuit.

In the following, an exemplary internal constitution of the black point compensation circuit 63 will be described. FIG. 14 is a diagram showing a first exemplary internal constitution of the black point compensation circuit 63.

The black point compensation circuit 63 shown in FIG. 14 comprises a delay circuit 631 for delaying an image signal C1 outputted from the arithmetic circuit 61, a delay circuit 632 for further delaying an output signal from the delay circuit 631, an average computing circuit 633 for computing a mean value of output signals from the delay circuit 632 and the inputted image signal C1, a delay circuit 634 for outputting a timing pulse T2 which was obtained by delaying the timing pulse T1 from the bright spot detection circuit 62, and a selector 635 which, in response to the timing pulse T2 from the delay circuit 634, switches between output signals from the delay circuit 631 and the average computing circuit 633, for outputting the output signal as an image signal C2 to the memory controller 6c.

The image signal C1 to be inputted into the black point compensation circuit 63, even though the fixed pattern noise thereof is removed, has a possibility to contain a black point noise. The delay circuit 631 delays the image signal C1 by one pixel with the same color. This signal is lead to one of the inputs of the selector 635 as an image signal C3 representing a pixel of a black point compensation object. Further, the delay circuit 632 delays the output signal from the delay circuit 631 further by one pixel with the same color, and supplies to the average computing circuit 633. Thereby, the average computing circuit 633, with respect to each pixel in the output signal from the delay circuit 631, computes a mean value of data from the preceding and subsequent pixels juxtaposed thereto so as to be supplied as an image signal C4 for the black point compensation to another input of the selector 635.

The delay circuit 634, in consideration that the image signal C3 which is the object of black point compensation is delayed by the delay circuit 631, in order for the timing pulse T1 to be phased in with this image signal C3, supplies a timing pulse T2 which was delayed from the timing pulse T1 to the selector 635. The selector 635, when the inputted timing pulse T2 is at L level, outputs the image signal C3 from the delay circuit 631, and when at H level, outputs the image signal C4 from the average computing circuit 633.

Figure 15:
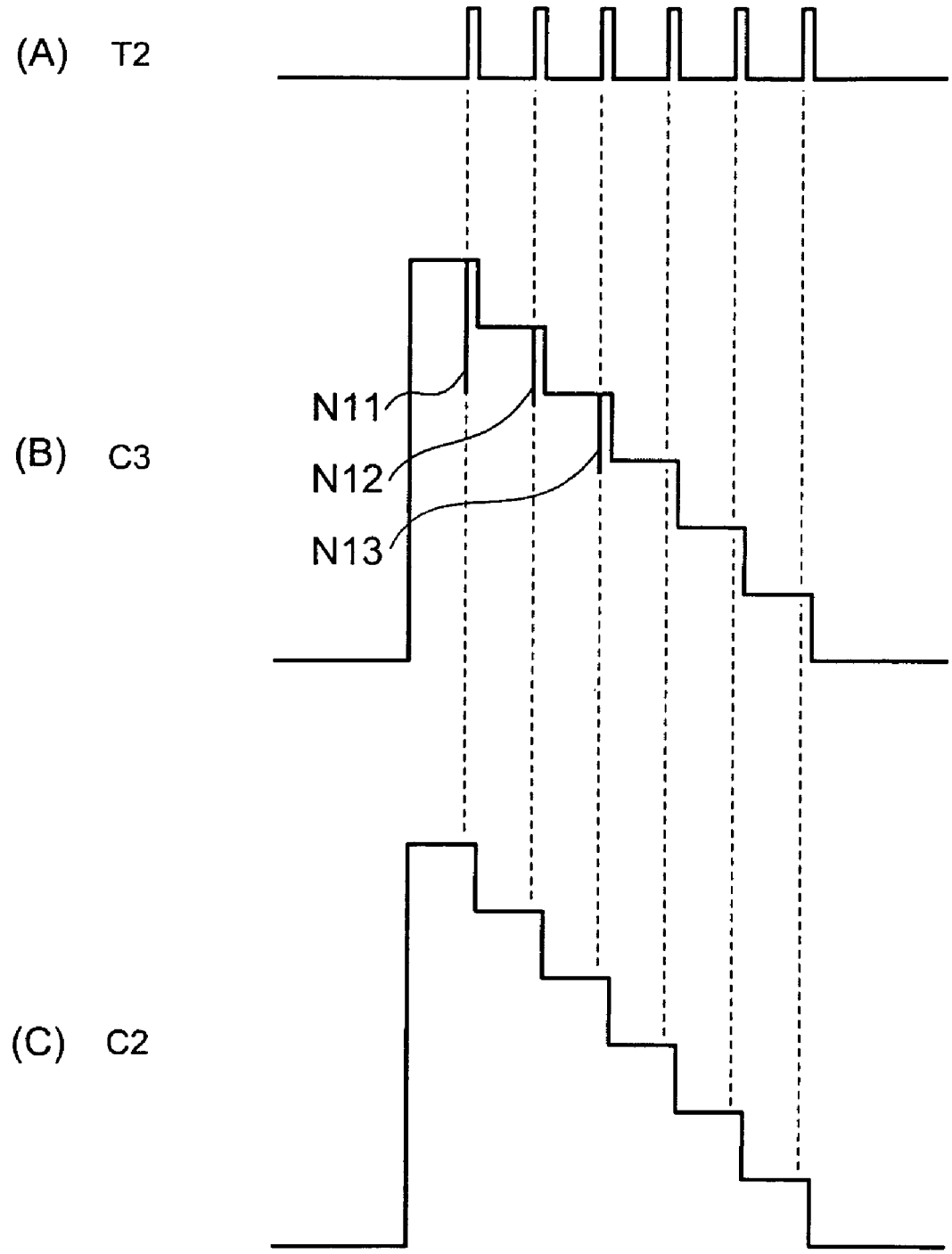
FIG. 15 is a diagram showing a mode of input/output signals in a selector.

Here, in FIG. 15, there are shown modes of input/output signals in the selector 635.

Timing pulses T2 shown in FIG. 15(A) indicate pixels at which a bright spot noise has occurred. Further, the image signal C3 from the delay circuit 631 is a signal of the image signal C1 which is merely delayed but has a possibility of containing a black point noise from which the fixed pattern noise is removed. For example, in the image signal C3 shown in FIG. 15(B), there are contained black point noises N11, N12 and N13. Further, the black point noise appears only in such a pixel where a bright spot noise has occurred.

Thereby, the selector 635, only at a timing when a pixel having a possibility of presence of a black point noise is supplied in the image signal C3 from the delay circuit 631, outputs the image signal C4 from the average computing circuit 633. An image signal C2 outputted as described above is shown in FIG. 15(C).

By the way, in the pixel with presence of a black point noise, a level of its color component is decreased extremely compared with those of pixels in the vicinity thereof. Therefore, in the average computing circuit 633, a mean value for the signals of the preceding and subsequent pixels adjacent to the object pixel for black point compensation is outputted, and in the selector 635, this image signal C4 is substituted for the pixel at an occurrence position of the black point noise. Thereby, on a captured image, the pixel at which the black point noise has occurred is smoothly connected with the color of the neighboring pixels thereby rendering the black points unnoticeable, thus improving the image quality.

In the black point compensation circuit 63 described above, by use of the mean value of signals of the preceding and the subsequent pixels with the same color adjacent to the pixel of the black point compensation object, the signal of the pixel with the presence of the black point noise is replaced and compensated, however, for example, the pixel with the presence of the black point noise may be replaced with the signal of either one of these pixels adjacent to this pixel so as to improve the image quality as well. In the following, an exemplary internal constitution of the black point compensation circuit 63 for executing such black point compensation will be described.

Figure 16A:
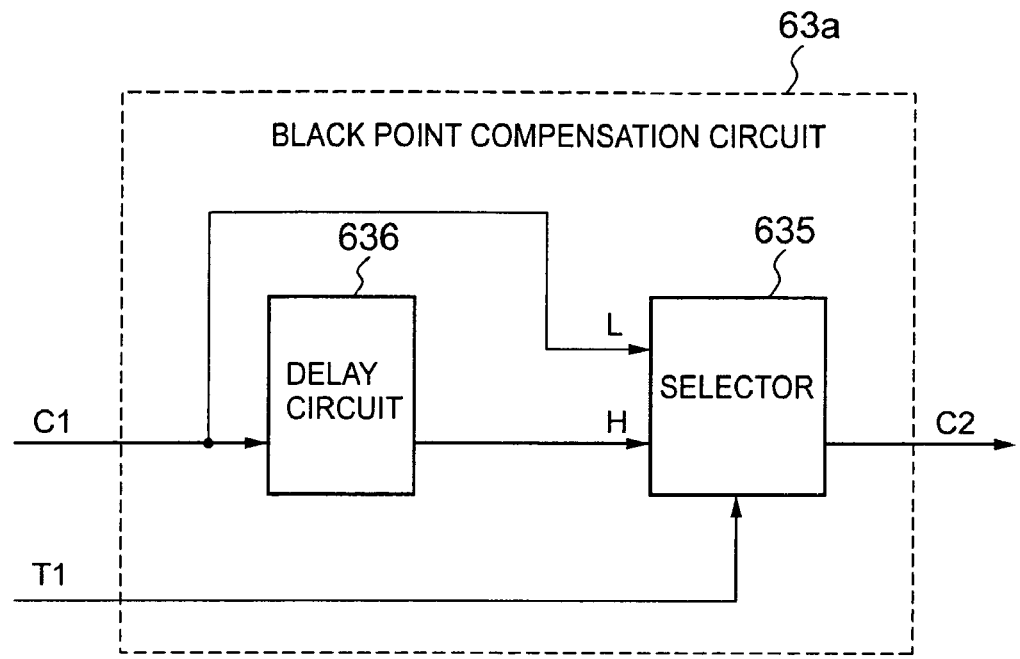
FIGS. 16A to 16B are diagrams showing a second and a third exemplary internal constitution of a black point compensation circuit.
Figure 16B:
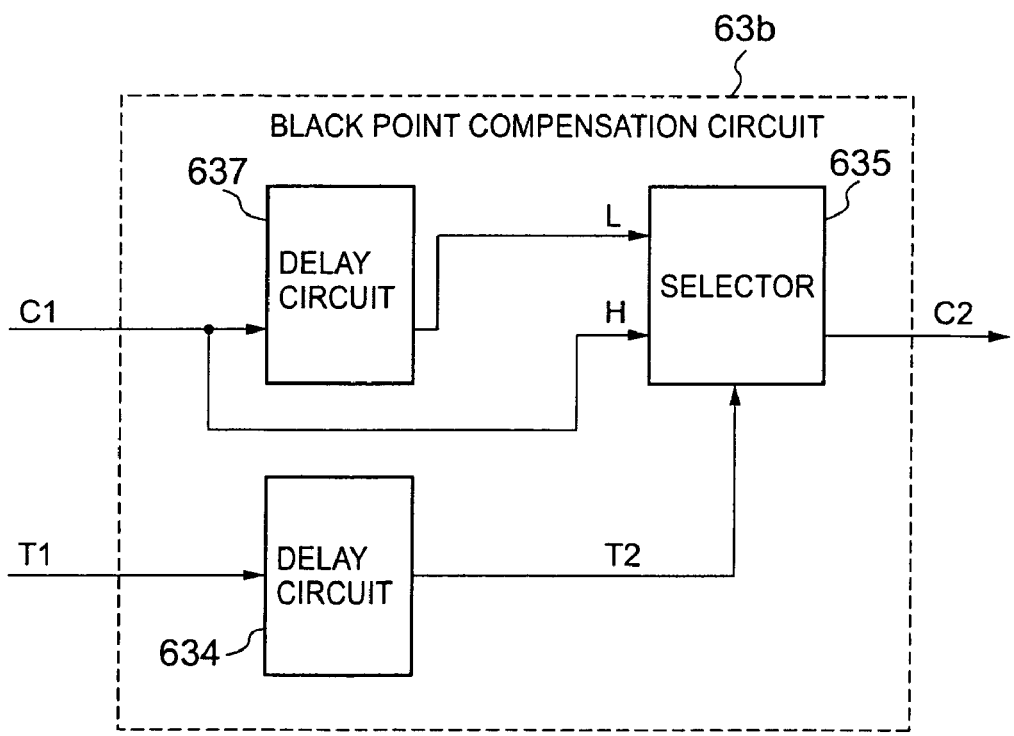

FIGS. 16A to 16B are diagrams showing a second and a third exemplary internal constitutions of the black point compensation circuit 63. By the way, in FIGS. 16A and 16B, function blocks having the same construction as the first exemplary internal constitution shown in FIG. 14 are labeled with the same reference numerals.

In FIG. 16A, as the second exemplary internal constitution, a black point compensation circuit 63a for compensating for a pixel with presence of a black point noise by replacing with a signal of a preceding pixel with the same color juxtaposed thereto is shown. This black point compensation circuit 63a comprises a delay circuit 636 for delaying the inputted image signal C1, and a selector 635 for selecting the image signal C1 when the inputted timing pulse T1 is at L level, and selecting an output signal from the delay circuit 636 when the same is at H level.

The delay circuit 636, which is provided with one or two stages of delay elements such as a D flip-flop or the like, delays the inputted image signal C1 by one pixel of the same color. Thereby, the selector 635 is supplied with the image signal C1 which is a black point compensation object and also a signal of a preceding pixel of the same color, preceding by one pixel (usually on the left side) from the delay circuit 636. Then, in response to the timing pulse T1, the signal of a pixel having a possibility of containing a black point noise is substituted for by the signal of the pixel preceding thereto by one pixel.

Further, in FIG. 16B, as the third exemplary internal constitution, a black point compensation circuit 63b for compensating for a pixel with presence of a black point noise by replacing with the signal of a following pixel with the same color juxtaposed thereto is shown. This black point compensation circuit 63b comprises a delay circuit 637 for delaying the inputted image signal C1, a delay circuit 634 for delaying the inputted timing pulse T2, and a selector 635 for outputting an output signal from the delay circuit 637 when the inputted timing pulse T2 is at L level, and outputting the image signal C1 when the same is at H level.

In this black point compensation circuit 63b, a signal which was delayed in the delay circuit 637 by one pixel of the same color becomes an object of the black point compensation. Further, the delay circuit 634, by delaying the inputted timing pulse T1, generates a timing pulse T2 which is phase-matched with a phase of the image signal C3 which was delayed by the delay circuit 637, and supplies to the selector 635. Thereby, the selector 635 is supplied with the image signal C1 which is the object of black point compensation and the signal of the pixel subsequent thereto by only one pixel with the same color (normally on the right side thereof) from the delay circuit 637. Then, in response to the timing pulse T2, the signal of a pixel having a possibility of containing a black point noise is replaced with the signal of the pixel thereafter by only one pixel.

According to the second and the third exemplary internal constitutions described above, the pixel with presence of a black point noise is replaced only with the signal of either one of the pixels juxtaposed thereto, thereby improving quality of a captured image. However, because it is displayed in the same color as that of either one of the juxtaposed pixels, the image having been compensated according to the first exemplary internal constitution described above has a greater effect by the compensation of the image quality. However, according to the second and the third exemplary internal constitutions, its circuitry construction is simpler than that of the first exemplary internal constitution, thereby enabling to suppress a cost of the production.

By the way, in the exemplary internal constitution of the bright spot detection circuit 62 and the black point compensation circuit 63 described hereinabove, as for the delay circuits for delaying the input image signals B2 and C1 as well as the timing pulse T1, the number of stages of the delay elements provided therein differs depending on a structure of its imaging device 3. This is because that depending on the structure of the imaging device 3, an interval of the same color in the layout of pixels varies.

Figure 17A:
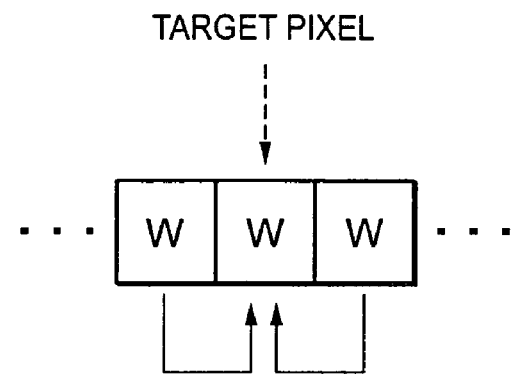
FIGS. 17A to 17B are diagrams showing a different exemplary pixel arrangement of image signals depending on a different constitution of the imaging device.
Figure 17B:
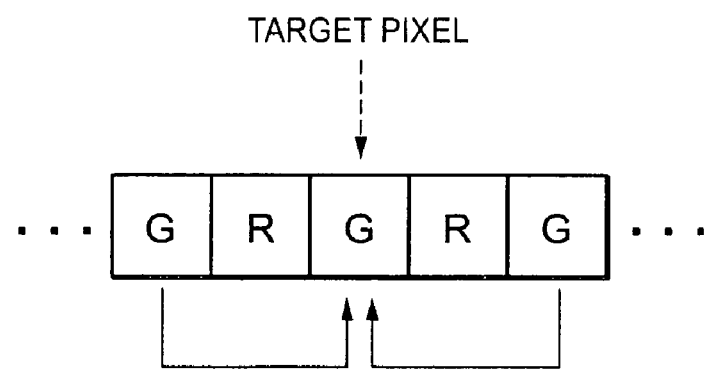
Figure 18:
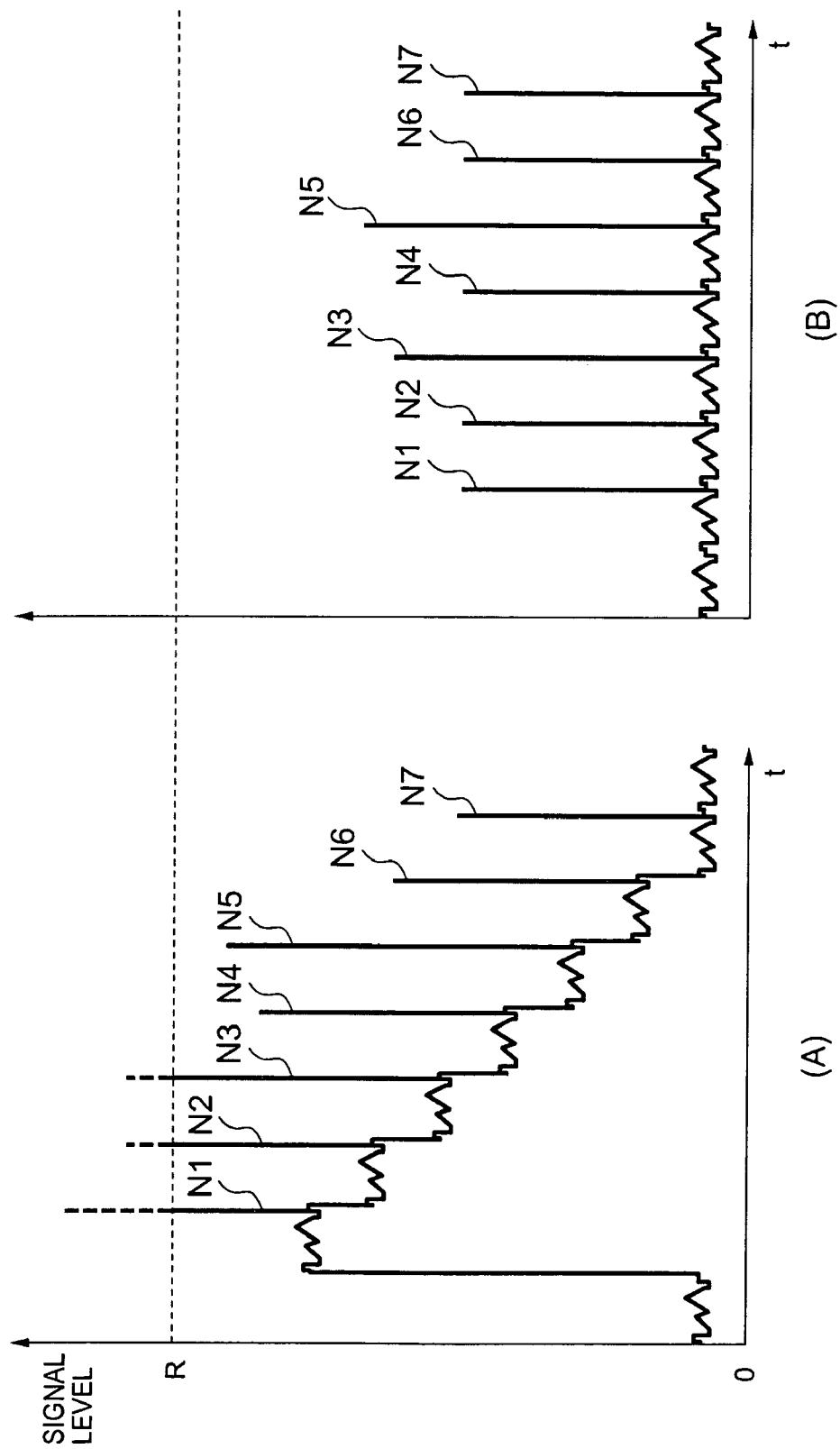
FIG. 18 is a diagram showing exemplary waveforms of an image signal captured in a conventional noise reduction method.
Figure 19:
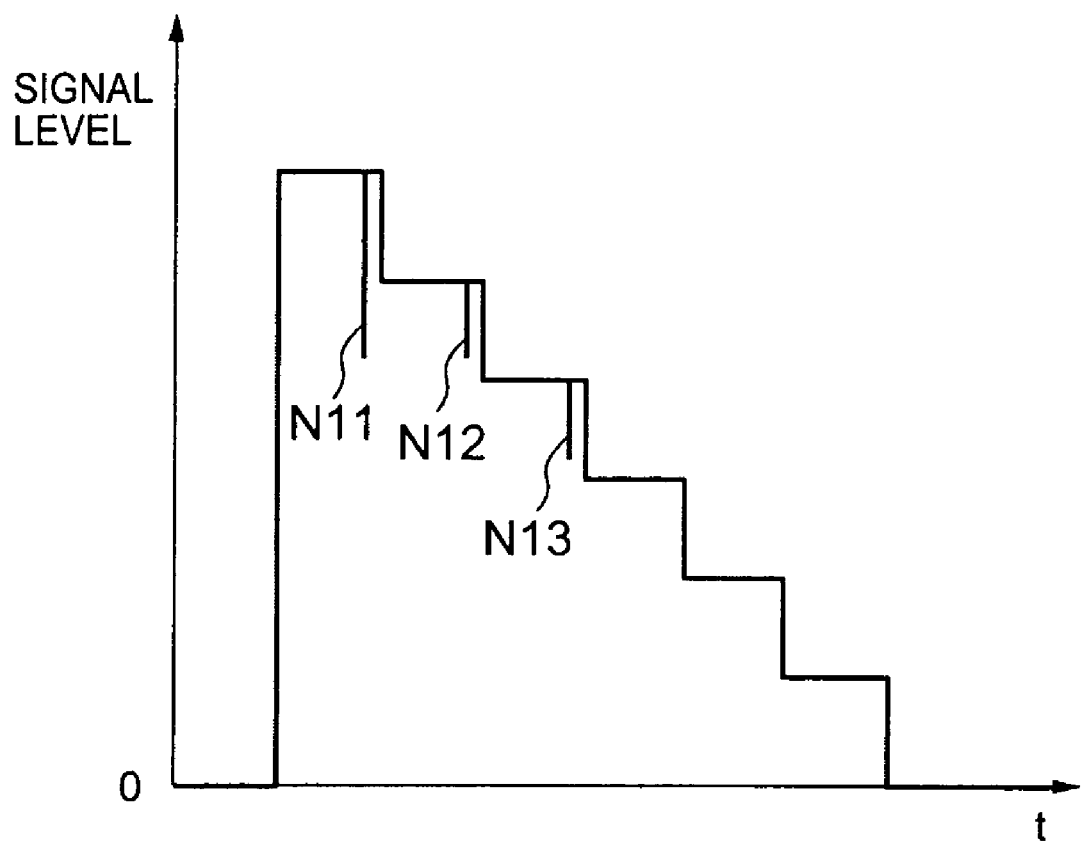
FIG. 19 is a diagram showing an exemplary waveform of an outputted image signal in the conventional noise reduction method.

Here, in FIGS. 17A to 17B, an example of variations in the pixel arrangement in the image signal depending on a difference in the structures of the imaging device 3 is shown.

In a black and white sensor or in a three wafer CCD, because only a same color signal is outputted from each device, all signals of juxtaposed pixels become the same color. Thereby, as shown in FIG. 17A, by setting the delay element in the delay circuit in one stage (corresponding to one clock), it becomes possible to obtain a delay corresponding to one pixel portion of the juxtaposed same color pixels.

Further, in a case of a single wafer CCD or the like provided with a 2 by 2 or 2 by 4 color filter array, color information of juxtaposed pixels differs from each other. Thereby, as shown in FIG. 17B, by setting the delay element in the delay circuit in two-stages (corresponding to two clocks), it becomes possible to obtain a delay corresponding to one pixel of the same color pixels.

In the image capturing apparatus 1 described above, because the pixel in which the bright spot noise has occurred is detected by use of the image signal B2 which was captured immediately after the normal capturing, the position of the pixel having a possibility of having occurred a black point noise can be detected easily and precisely. Further, on the basis of this detection, as for the pixel having the possibility of occurrence of the black point noise, because this is compensated for by use of the data of the pixel in the vicinity thereof, the pixel appearing as a black point is rendered unnoticeable, thereby enabling easily to improve the quality of the captured images.

By the way, in the exemplary embodiments described hereinabove, the capturing in the state with the shutter closed is executed immediately after the normal capturing, however, conversely, the capturing in the state with the shutter closed may be executed immediately before the normal capturing. In this case, the microcomputer 9, upon receiving a request to start capturing from the user through input operation or the like, carries out setting of the iris 2b, the front end 5 and the TG 8 for a normal capturing, firstly closing the shutter 2c and causing the front end 5 to execute sampling of an image signal, then to capture the image with the shutter 2c set in the normal state, thereby generating an image signal. In the image memory 7, at first the image signal B2 captured with the shutter closed is stored, after then, the image signal A2 captured by the normal capturing is stored, both of which are outputted simultaneously to the preprocessing circuit 6a.

Still further, according to the exemplary embodiment described above, both of the image signal A2 normally captured and the image signal B2 captured with the shutter closed are once stored in the image memory 7, after then, they are outputted to the preprocessing circuit 6a, however, it is not limited thereto. For example, it may be arranged also such that, after one of these image signals is stored in the image memory 7, at the time when the other image is captured, the one of these image signals is read from the image memory 7, so as to supply both of the image signals simultaneously to the preprocessing circuit 6a. Still more, it may be arranged also such that, without storing the image signal C2 outputted from the preprocessing circuit 6a once in the image memory 7, it may be supplied directly to the main processing circuit 6b.

By arranging as described above, because the frequency of accessing the image memory 7 and the amount of data to transfer are suppressed, a time period from start of capturing to storing a final image signal can be shortened, and also power consumption can be reduced.

As described heretofore, in the image capturing apparatus according to the present invention, by the bright spot position detection means, from the second image data produced, immediately before or after the ordinary capturing, by capturing with the shutter closed under the same exposure condition as that of the ordinary capturing with the shutter opened, the occurrence position of the bright spot noise is detected. Then, by the noise compensation means, as for the data obtained by subtracting the second image data from the first image data by the ordinary capturing, the data of the pixel corresponding to the occurrence position of the bright spot noise detected is compensated for. Thereby, because the occurrence position of the bright spot noise in the output data from the subtraction means can be easily and precisely detected, and compensated, it becomes possible to eliminate the bright spot noise and enhance the quality of captured image.

Further, according to the noise elimination method of the present invention, from the second image data produced by capturing with the shutter closed under the same exposure condition as that of the ordinary capturing with the shutter opened captured immediately before or after thereof, the occurrence position of the bright spot noise is detected. Then, as for the data obtained by subtracting the second image data from the first image data by the ordinary capturing, the data of the pixel corresponding to the occurrence position of the bright spot noise detected is compensated. Thereby, because the occurrence position of the bright spot noise in the image data obtained by subtraction can be easily and precisely detected, and compensated, it becomes possible to eliminate the bright spot noise and enhance the quality of captured images.

The invention claimed is:

1. An image capturing apparatus for capturing an object using a solid-state imaging device, comprising:
   subtraction means for subtracting second image data, which is captured with a shutter closed under a same exposure condition as an ordinary capturing, immediately before or after thereof and digitalized, from first image data, which is captured by an ordinary capturing mode with the shutter opened and digitalized;
   adder means for adding an offset, for negative noise, to a signal value from said subtraction means;
   limiter means for limiting a signal level from said adder means;
   bright spot position detection means for detecting an occurrence position of a bright spot noise, which is a high level noise which produces a bright spot on a captured image, in said second image data; and
   noise compensation means for compensating for data of a pixel corresponding to the occurrence position of said bright spot noise detected by said bright spot position detection means, with respect to output data from said limiter means, wherein:
   said bright spot position detection means comprises detecting the occurrence position of said bright spot noise if a signal level of said pixel reaches a predetermined value.

2. The image capturing apparatus as claimed in claim 1, wherein said compensation means replaces data of each pixel corresponding to the occurrence position of said bright spot noise with average data of two pixels of a same color adjacent thereto.

3. The image capturing apparatus as claimed in claim 1, wherein said compensation means replaces data of each pixel corresponding to the occurrence position of said bright spot noise with data of either one of the two pixels of a same color adjacent thereto.

4. The image capturing apparatus as claimed in claim 1, wherein said bright spot position detection means outputting a timing pulse at each pixel position at which the bright spot noise has occurred.

5. The image capturing apparatus as claimed in claim 4, wherein said noise compensation means determines a position of said bright spot noise based on the timing pulse output from said bright spot position detection means.

6. An image capturing apparatus for capturing an object using a solid-state imaging device, comprising:
   subtraction means for subtracting second image data, which is captured with a shutter closed under a same exposure condition as an ordinary capturing, immediately before or after thereof and digitalized, from first image data, which is captured by an ordinary capturing mode with the shutter opened and digitalized;
   adder means for adding an offset, for negative noise, to a signal value from said subtraction means;
   limiter means for limiting a signal level from said adder means;
   bright spot position detection means for detecting an occurrence position of a bright spot noise, which is a high level noise which produces a bright spot on a captured image, in said second image data; and
   noise compensation means for compensating for data of a pixel corresponding to the occurrence position of said bright spot noise detected by said bright spot position detection means, with respect to output data from said limiter means, wherein:
   said bright spot position detection means detects the occurrence position of said bright spot noise if a value, obtained by subtracting an average signal level of two pixels adjacent to said pixel from a signal level of said pixel, reaches the predetermined value.

7. An image capturing apparatus for capturing an object using a solid-state imaging device, comprising:
   subtraction means for subtracting second image data, which is captured with a shutter closed under a same exposure condition as an ordinary capturing, immediately before or after thereof and digitalized, from first image data, which is captured by an ordinary capturing mode with the shutter opened and digitalized;
   adder means for adding an offset, for negative noise, to a signal value from said subtraction means;
   limiter means for limiting a signal level from said adder means;
   bright spot position detection means for detecting an occurrence position of a bright spot noise, which is a high level noise which produces a bright spot on a captured image, in said second image data; and
   noise compensation means for compensating for data of a pixel corresponding to the occurrence position of said bright spot noise detected by said bright spot position detection means, with respect to output data from said limiter means,
   wherein said bright spot position detection means detects the occurrence position of said bright spot noise if a value, obtained by subtracting a signal level of either one of pixels adjacent to said pixel from a signal level of said pixel reaches the predetermined value.

8. A noise elimination method for eliminating a noise occurring at a time of capturing an object using a solid-state imaging device, comprising the steps of:
   subtracting, from first image data which is captured by an ordinary capturing mode with a shutter opened and then digitalized, second image data which is captured immediately before or after the ordinary capturing with a shutter closed in a same exposure condition as said ordinary capturing and then digitalized;
   adding an offset for a negative noise to data resulting from said subtraction;
   limiting a signal level of the offset data;

detecting an occurrence position of a bright spot noise in said second image data, which is a high level noise which produces a bright spot on a captured image, if a signal level of a pixel in said second pixel data reaches a predetermined value; and compensating for data of said pixel corresponding to the occurrence position of said bright spot noise detected, with respect to data resulting from said limiting.

* * * * *